(12) United States Patent
Imai et al.

(10) Patent No.: US 12,538,575 B2
(45) Date of Patent: Jan. 27, 2026

(54) DISPLAY WITH TFT HAVING A TWO-LAYER GATE INSULATOR

(71) Applicant: Sharp Display Technology Corporation, Kameyama (JP)

(72) Inventors: Hajime Imai, Kameyama (JP); Tohru Daitoh, Kameyama (JP); Teruyuki Ueda, Kameyama (JP); Yoshihito Hara, Kameyama (JP); Masaki Maeda, Kameyama (JP); Tatsuya Kawasaki, Kameyama (JP); Yoshiharu Hirata, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 896 days.

(21) Appl. No.: 17/686,485

(22) Filed: Mar. 4, 2022

(65) Prior Publication Data
US 2022/0285405 A1    Sep. 8, 2022

(30) Foreign Application Priority Data

Mar. 5, 2021  (JP) ................................. 2021-035551

(51) Int. Cl.
| | |
|---|---|
| H01L 27/12 | (2006.01) |
| G06F 3/041 | (2006.01) |
| H10D 86/01 | (2025.01) |
| H10D 86/40 | (2025.01) |
| H10D 86/60 | (2025.01) |

(52) U.S. Cl.
CPC .......... *H10D 86/60* (2025.01); *G06F 3/0412* (2013.01); *H10D 86/0212* (2025.01); *H10D 86/0221* (2025.01); *H10D 86/423* (2025.01)

(58) Field of Classification Search
CPC .................................................. H01L 27/1225
See application file for complete search history.

(56) References Cited

U.S. PATENT DOCUMENTS

| | | | | |
|---|---|---|---|---|
| 2011/0175674 | A1* | 7/2011 | Shimizu ............. | H10D 30/6755 |
| | | | | 257/E29.296 |
| 2012/0161125 | A1* | 6/2012 | Yamazaki ......... | H01L 29/78693 |
| | | | | 257/E21.409 |

(Continued)

FOREIGN PATENT DOCUMENTS

| | | | | |
|---|---|---|---|---|
| CN | 103348483 A | * | 10/2013 | ......... H10D 30/6757 |
| JP | 2015-109315 A | | 6/2015 | |
| WO | 2015/186619 A1 | | 12/2015 | |

*Primary Examiner* — Peter Bradford
(74) *Attorney, Agent, or Firm* — Keating & Bennett, LLP

(57) ABSTRACT

An active matrix substrate includes a substrate and a plurality of oxide semiconductor TFTs supported on the substrate, in which each of oxide semiconductor TFT includes an oxide semiconductor layer including a first region and a second region having a specific resistance lower than a specific resistance of the first region, and a gate electrode disposed on at least a part of the first region with a gate insulating layer interposed therebetween, the gate insulating layer includes a first insulating layer and a second insulating layer disposed on the first insulating layer, and, when viewed from a normal direction of the substrate, the first insulating layer overlaps with the first region and does not overlap with the second region and the second insulating layer overlaps with the first region and at least a part of the second region.

14 Claims, 16 Drawing Sheets

(56) References Cited

U.S. PATENT DOCUMENTS

| | | | |
|---|---|---|---|
| 2013/0314976 A1* | 11/2013 | Onuki | G11C 11/40 365/149 |
| 2017/0017338 A1* | 1/2017 | Tsai | G06F 3/0443 |
| 2017/0090229 A1* | 3/2017 | Imai | H01L 29/78633 |
| 2018/0076102 A1* | 3/2018 | Ka | H10D 62/80 |
| 2018/0261632 A1* | 9/2018 | Choi | H01L 27/1225 |
| 2020/0089038 A1* | 3/2020 | Yoshino | G06F 3/0445 |
| 2021/0091233 A1* | 3/2021 | Yang | H10K 59/1213 |

* cited by examiner

DISPLAY WITH TFT HAVING A TWO-LAYER GATE INSULATOR

CROSS-REFERENCE TO RELATED APPLICATIONS

This application claims the benefit of priority to Japanese Patent Application Number 2021-035551 filed on Mar. 5, 2021. The entire contents of the above-identified application are hereby incorporated by reference.

BACKGROUND

Technical Field

The present disclosure relates to an active matrix substrate and a manufacturing method thereof.

An active matrix substrate used in a liquid crystal display device, an organic electroluminescence (EL) display device, or the like includes a display region including a plurality of pixels, and a region other than the display region (a non-display region or a frame region). The display region includes a switching element such as a Thin Film Transistor (hereinafter referred to as a "TFT") for each of the pixels. As such a switching element, a TFT including an amorphous silicon film serving as an active layer (hereinafter referred to as an "amorphous silicon TFT") and a TFT including a polycrystalline silicon film serving as an active layer (hereinafter referred to as a "polycrystalline silicon TFT") have been widely used.

There is proposed use of an oxide semiconductor as a material of the active layer of the TFT, in place of amorphous silicon and polycrystalline silicon. Such a TFT is referred to as an "oxide semiconductor TFT". The oxide semiconductor has a higher mobility than amorphous silicon. Thus, the oxide semiconductor TFT can operate at a higher speed than the amorphous silicon TFT.

A structure of the TFT is roughly classified into a bottom gate structure and a top gate structure. Currently, the bottom gate structure is often adopted for the oxide semiconductor TFT, but it is also proposed to use the top gate structure (see, for example, JP 2015-109315 A). In the top gate structure, a gate electrode is disposed on a part of an oxide semiconductor layer with a gate insulating layer interposed therebetween.

On the other hand, WO 2015/186619, the application being filed by the present applicant, also proposes a wiring line structure in which source bus lines are provided closer to a substrate than gate bus lines and an oxide semiconductor layer of an oxide semiconductor TFT (hereinafter, referred to as a "bottom source wiring line structure"). According to a TFT substrate having the bottom source wiring line structure, the thickness of an insulating layer located between the source bus lines and the gate bus lines can be increased, and parasitic capacitance generated at intersections of these bus lines can thus be reduced.

SUMMARY

However, in the oxide semiconductor TFT having the top gate structure, when a gate insulating film is formed, electrically conductive foreign matter (dust or particles) may enter the gate insulating film, or a defect portion such as a pinhole may be formed in the gate insulating film. As a result, leakage is likely to occur between a source and a gate or between a drain and the gate, which may decrease a yield.

An embodiment of the present disclosure has been conceived in light of the above-described circumstances, and an object of the present disclosure is to provide an active matrix substrate having a top gate structure and including an oxide semiconductor TFT capable of suppressing leakage between a source and a gate or between a drain and the gate.

An active matrix substrate and a method for manufacturing the active matrix substrate are disclosed herein in the following items.

Item 1

An active matrix substrate including: a substrate; and a plurality of oxide semiconductor TFTs supported on the substrate, in which each of the plurality of oxide semiconductor TFTs includes an oxide semiconductor layer including a first region and a second region having a specific resistance lower than a specific resistance of the first region, and a gate electrode disposed on at least a part of the first region of the oxide semiconductor layer with a gate insulating layer interposed between the gate electrode and the part of the first region of the oxide semiconductor layer, the gate insulating layer includes a first insulating layer and a second insulating layer disposed on the first insulating layer, and the first insulating layer overlaps with the first region and does not overlap with the second region, and the second insulating layer overlaps with the first region and at least a part of the second region, when viewed from a normal direction of the substrate.

Item 2

The active matrix substrate according to item 1, in which the second insulating layer covers a side surface and an upper surface of the first insulating layer.

Item 3

The active matrix substrate according to item 1 or 2, in which the first insulating layer includes an insulating material different from an insulating material of the second insulating layer.

Item 4

The active matrix substrate according to any one of items 1 to 3, in which the second insulating layer is in direct contact with the at least a part of the second region.

Item 5

The active matrix substrate according to any one of items 1 to 4, in which the first region of the oxide semiconductor layer includes a channel region overlapping with the gate electrode, and an offset region not overlapping with the gate electrode but overlapping with the first insulating layer, when viewed from the normal direction of the substrate.

Item 6

The active matrix substrate according to any one of items 1 to 5, in which the second insulating layer is a layer capable of reducing an oxide semiconductor included in the oxide semiconductor layer.

Item 7

The active matrix substrate according to any one of items 1 to 6, in which the second insulating layer is a hydrogen-donating layer capable of supplying hydrogen, and the first insulating layer is an oxygen-donating layer capable of supplying oxygen.

Item 8

The active matrix substrate according to item 7, in which the first insulating layer is a silicon oxide layer, and the second insulating layer is a silicon nitride layer.

Item 9

The active matrix substrate according to any one of items 1 to 8, in which the first insulating layer includes a tapered portion on a side surface of the first insulating layer,
the first region of the oxide semiconductor layer includes a main portion overlapping with the upper surface of the first insulating layer, and a side portion overlapping with the tapered portion, when viewed from the normal direction of the substrate, and
a specific resistance of the side portion is lower than a specific resistance of the main portion and higher than the specific resistance of the second region.

Item 10

The active matrix substrate according to any one of items 1 to 9, further including:
a plurality of gate bus lines supported by the substrate and extending in a first direction; and
a plurality of source bus lines supported by the substrate and extending in a second direction intersecting with the first direction, in which
the active matrix substrate includes a plurality of pixel areas and each of the plurality of oxide semiconductor TFTs is disposed in association with one of the plurality of pixel areas,
each of the plurality of oxide semiconductor TFTs further includes a source electrode electrically connected to a part of the second region of the oxide semiconductor layer, and
the gate electrode of each of the plurality of oxide semiconductor TFTs is electrically connected to one of the plurality of gate bus lines, and the source electrode is electrically connected to one of the plurality of source bus lines.

Item 11

The active matrix substrate according to item 10, in which
the plurality of source bus lines are located closer to the substrate than the oxide semiconductor layer of each of the plurality of oxide semiconductor TFTs and the plurality of gate bus lines, and
in an intersection where one of the plurality of source bus lines intersects with one of the plurality of gate bus lines, an insulating layer formed of an insulating film same as an insulating film of the first insulating layer and the second insulating layer extending on the insulating layer are located between the one source bus line and the one gate bus line.

Item 12

The active matrix substrate according to item 11, in which the first insulating layer and the insulating layer are connected.

Item 13

The active matrix substrate according to item 11, in which the first insulating layer and the insulating layer are spaced apart.

Item 14

The active matrix substrate according to item 10, in which the first insulating layer extends across two or more pixel areas aligned in the first direction of the plurality of pixel areas between the one of the plurality of gate bus lines and the substrate.

Item 15

The active matrix substrate according to item 14, in which an edge of a portion of the one of the plurality of gate bus lines, the portion being located above the first insulating layer, is located inside the first insulating layer, when viewed from the normal direction of the substrate.

Item 16

The active matrix substrate according to item 10, in which the first insulating layer extends across two or more pixel areas aligned in the second direction of the plurality of pixel areas.

Item 17

The active matrix substrate according to item 10, further including
a plurality of touch wiring lines, in which
each of the plurality of touch wiring lines extends in the second direction, at least partially overlapping with one of the plurality of source bus lines, when viewed from the normal direction of the substrate, and
an insulating layer formed of an insulating film same as an insulating film of the first insulating layer and the second insulating layer extending on the insulating layer are located between each of the plurality of touch wiring lines and the one source bus line.

Item 18

The active matrix substrate according to item 17, in which each of the plurality of touch wiring lines is located closer to the substrate than the oxide semiconductor layer of each of the plurality of oxide semiconductor TFTs and the plurality of gate bus lines, and the one source bus line is disposed on an interlayer insulating layer covering the plurality of gate bus lines.

Item 19

The active matrix substrate according to any one of items 1 to 10, further including
an interlayer insulating layer covering the gate electrode of each of the plurality of oxide semiconductor TFTs, in which
the source electrode of each of the plurality of oxide semiconductor TFTs is disposed on the interlayer insulating layer, and is electrically connected to the part of the second region of the oxide semiconductor layer in an opening formed in the interlayer insulating layer and the second insulating layer.

Item 20

The active matrix substrate according to any one of items 1 to 19, further including a display region including a plurality of pixel areas, a non-display region provided around the display region, and a peripheral circuit disposed in the non-display region, in which
each of the plurality of oxide semiconductor TFTs includes one or more TFTs constituting the peripheral circuit.

Item 21

The active matrix substrate according to any one of items 1 to 19, in which the oxide semiconductor layer of each of the plurality of oxide semiconductor TFTs includes an In—Ga—Zn—O-based semiconductor.

Item 22

The active matrix substrate according to item 21, in which the In—Ga—Zn—O-based semiconductor includes a crystalline portion.

Item 23

A method for manufacturing an active matrix substrate including a plurality of oxide semiconductor TFTs, the method including:
in a TFT forming region in which each of the plurality of oxide semiconductor TFTs is formed,
(A) forming, on a substrate, an oxide semiconductor layer serving as an active layer of each of the plurality of oxide semiconductor TFTs;
(B) forming a first insulating layer on a part of the oxide semiconductor layer by using a first insulating film;

(C) lowering a specific resistance of a portion, of the oxide semiconductor layer, exposed from the first insulating layer to a specific resistance lower than a specific resistance of the part of the oxide semiconductor layer;

(D) forming a second insulating layer on the first insulating layer and the oxide semiconductor layer by using a second insulating film; and (E) forming a gate electrode on the second insulating layer to at least partially overlap with the part of the oxide semiconductor layer when viewed from a normal direction of the substrate.

Item 24

The manufacturing method according to item 23, in which the lowering of a specific resistance (C) includes performing resistance lowering processing of the oxide semiconductor layer using the first insulating layer as a mask.

Item 25

The manufacturing method according to item 23, in which the second insulating film is an insulating film capable of reducing an oxide semiconductor of the oxide semiconductor layer, and the lowering of a specific resistance (C) is performed by forming the second insulating film to be in contact with the exposed portion of the oxide semiconductor layer, in the forming of a second insulating layer (D).

According to an embodiment of the present disclosure, there is provided an active matrix substrate having a top gate structure and including an oxide semiconductor TFT capable of suppressing leakage between a source and a gate or between a drain and the gate.

BRIEF DESCRIPTION OF DRAWINGS

The disclosure will be described with reference to the accompanying drawings, wherein like numbers reference like elements.

FIG. 4A is a plan view illustrating another example of a planar shape of the first insulating layer 8a.

FIG. 4B is a plan view illustrating yet another example of the planar shape of the first insulating layer 8a.

FIG. 4C is a plan view illustrating yet another example of the planar shape of the first insulating layer 8a.

DESCRIPTION OF EMBODIMENTS

First Embodiment

Hereinafter, an active matrix substrate according to a first embodiment will be described with reference to the accompanying drawings.

The active matrix substrate according to the present embodiment is used, for example, for a liquid crystal display device.

Basic Configuration of Active Matrix Substrate 1001

Figure 1:
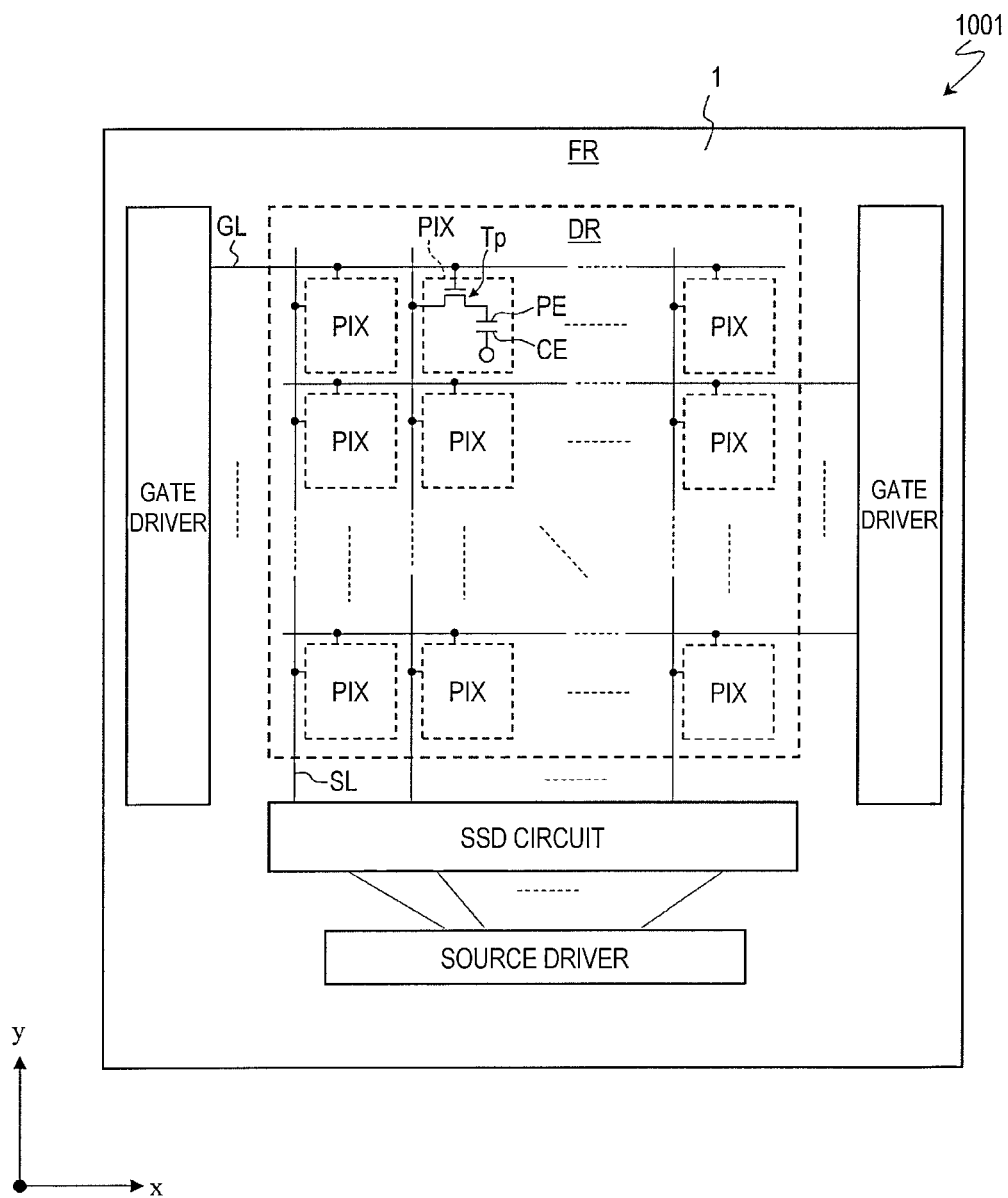
FIG. 1 is a schematic diagram illustrating an example of a planar structure of an active matrix substrate 1001 according to a first embodiment.

FIG. 1 is a schematic diagram illustrating an example of a planar structure of an active matrix substrate 1001 according to the present embodiment.

The active matrix substrate 1001 has a display region DR, and a region (a non-display region or a frame region) FR other than the display region DR. The display region DR is constituted of a plurality of pixel areas PIX arranged in a matrix shape. Each of the plurality of pixel areas PIX (also simply referred to as a "pixel") is an area corresponding to a pixel of the display device. The non-display region FR is a region positioned in a periphery of the display region DR and does not contribute to display.

In the non-display region FR, for example, a gate driver, a demultiplexer circuit functioning as an SSD circuit, and the like are monolithically provided on a substrate 1. A source driver is mounted on the active matrix substrate 1001, for example.

In the display region DR, a plurality of gate bus lines GL extending in a row direction (x direction, hereinafter referred to as a "first direction"), and a plurality of source bus lines SL extending in a column direction (y direction, hereinafter referred to as a "second direction") are formed. Each of the plurality of pixel areas PIX is defined by the gate bus line GL and the source bus line SL, for example. The gate bus lines GL are connected to respective terminals of the gate driver. The source bus lines SL are connected to respective terminals of the source driver.

Each of the plurality of pixel areas PIX includes a thin film transistor Tp and a pixel electrode PE. The thin film transistor Tp is also referred to as a "pixel TFT". A gate electrode of the thin film transistor Tp is electrically connected to the corresponding gate bus line GL, and a source electrode of the thin film transistor Tp is electrically connected to the corresponding source bus line SL. A drain electrode of the thin film transistor Tp is electrically connected to the pixel electrode PE. When the active matrix substrate 1001 is applied to a display device in a transverse electrical field mode such as a fringe field switching (FFS) mode, although not illustrated, the active matrix substrate 1001 is provided with an electrode common to the plurality of pixels (common electrode).

A plurality of circuit TFTs constituting the peripheral circuits are formed in the non-display region of the active matrix substrate 1001. Each of the circuit TFTs includes a drive circuit TFT constituting the gate driver, an SSD circuit TFT constituting the SSD circuit, and the like.

In the present embodiment, the active matrix substrate 1001 includes a plurality of oxide semiconductor TFTs having a top gate structure. Each of the oxide semiconductor TFTs may be a pixel TFT or a circuit TFT.

Configuration of Pixel Area PIX and Top Gate TFT

Each of the plurality of pixel areas PIX in the active matrix substrate 1001 will be described with reference to the drawings. In addition, a structure of a top gate type oxide semiconductor TFT will be described using the pixel TFT as an example. The active matrix substrate 1001 typically has the plurality of pixel areas and the plurality of pixel TFTs, but only a single pixel area and a single pixel TFT disposed in the pixel area will be illustrated and described below.

Figure 2A:
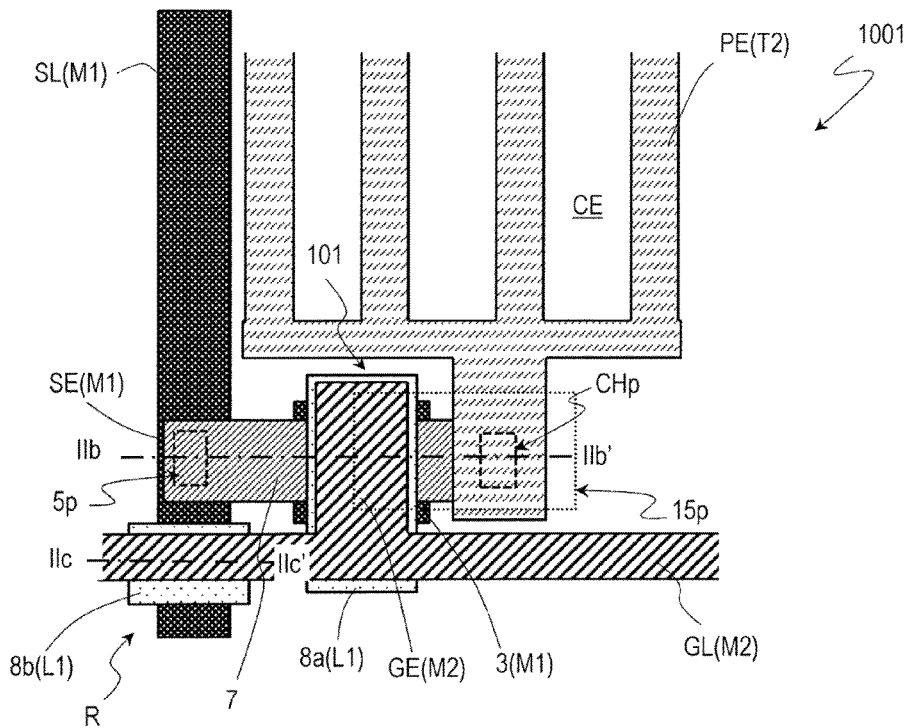
FIG. 2A is a plan view illustrating one pixel area PIX in the active matrix substrate 1001.
Figure 2B:
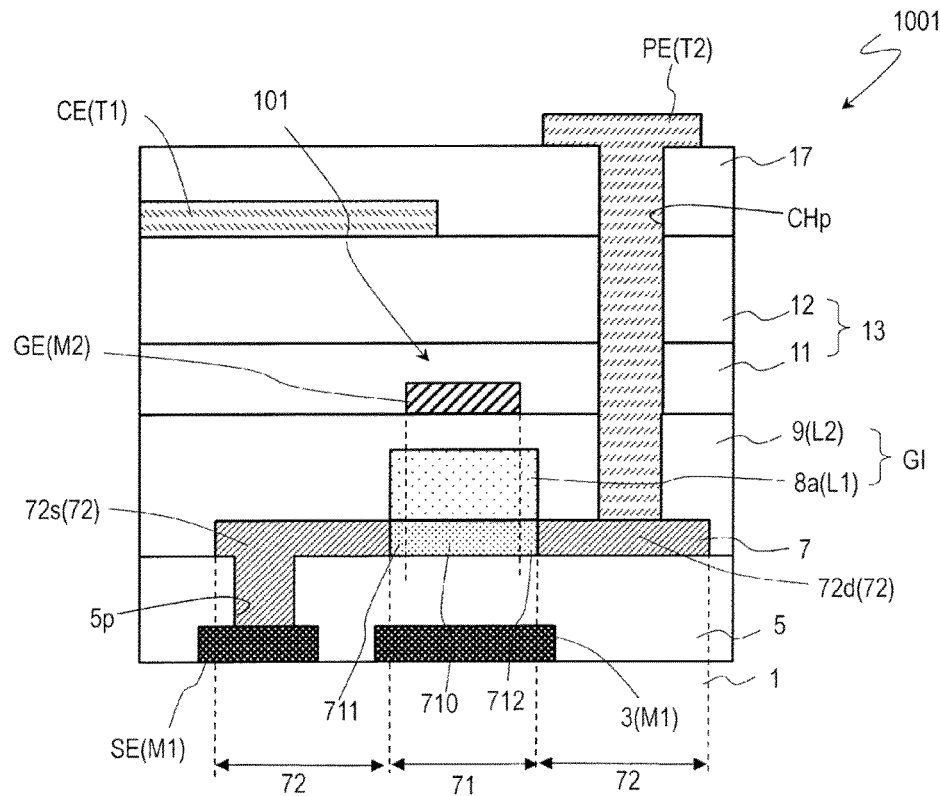
FIG. 2B is a cross-sectional view taken along a line IIb-IIb' in FIG. 2A.
Figure 2C:
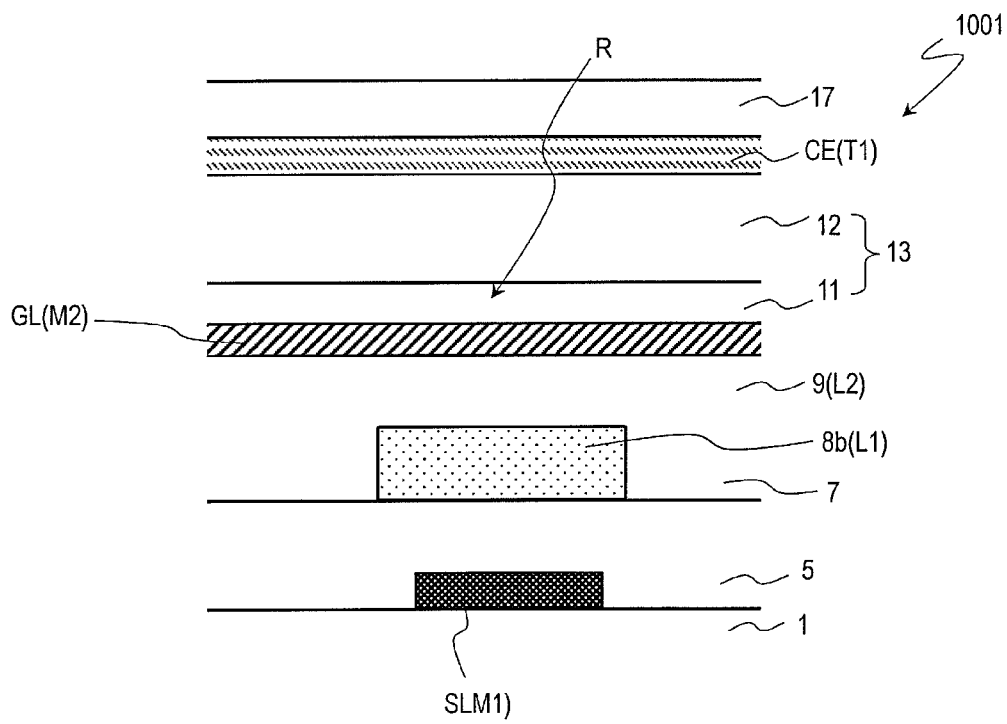
FIG. 2C is a cross-sectional view taken along a line IIc-IIc' in FIG. 2A.

FIG. 2A is a plan view exemplifying one pixel area PIX in the active matrix substrate 1001. FIG. 2B is a cross-sectional view taken along a line IIb-IIb' in FIG. 2A and illustrates a cross-sectional structure of a TFT (pixel TFT) 101 formed in the pixel area PIX. FIG. 2C is a cross-sectional view taken along a line IIc-IIc' illustrated in FIG. 2A, and illustrates an intersection R of a source bus line SL and a gate bus line GL.

First, a layer structure of the active matrix substrate 1001 will be described. The active matrix substrate 1001 includes a first metal layer M1, a lower insulating layer 5, an oxide semiconductor film, a first insulating film L1, a second insulating film L2, a second metal layer M2, and an upper insulating layer 13 in this order from the substrate 1 side.

The first metal layer M1 is a layer including electrodes, wiring lines, and the like formed of a first conductive film, and includes, for example, light blocking layers of the respective TFTs. The second metal layer M2 is a layer including electrodes, wiring lines, and the like formed of a second conductive film, and includes, for example, the gate bus line GL, gate electrodes of the respective pixel TFTs, and the like.

In the drawings, a reference sign for each constituent element may be followed by a sign indicating the metal layer or the insulating film in parenthesis. For example, "(M1)" may be added after the reference sign of the electrode or wiring line formed in the first metal layer M1.

The active matrix substrate 1001 includes the substrate 1, the plurality of source bus lines SL and the plurality of gate bus lines GL supported by the substrate 1. In the illustrated example, the source bus lines SL are formed in the first metal layer M1, and the gate bus lines GL are formed in the second metal layer M2. In other words, the source bus lines SL are located closer to the substrate than the gate bus lines GL and the oxide semiconductor film (bottom source wiring line structure).

Each pixel area PIX includes the substrate 1, the TFT 101 supported by the substrate 1, a pixel electrode PE, and a common electrode CE. It is only necessary that the TFT 101 be arranged to correspond to the pixel area PIX, and a part thereof may be located in another pixel area.

The TFT 101 includes an oxide semiconductor layer 7, a gate electrode GE disposed on a part of the oxide semiconductor layer 7 with a gate insulating layer GI interposed therebetween, and a source electrode SE. In this example, a part of the pixel electrode PE functions as a drain electrode of the TFT 101, but the TFT 101 may include a drain electrode in a metal layer different from the pixel electrode PE.

The oxide semiconductor layer 7 includes a first region 71 and a second region (low-resistive region) 72 having a specific resistance lower than a specific resistance of the first region 71. The second region 72 may be a conductive region. At least a part of the first region 71 is covered with the gate electrode GE with the gate insulating layer GI interposed therebetween, and functions as a channel. The second region (low-resistive region) 72 has a source contact region 72s and a drain contact region 72d respectively located on both sides of the first region 71 when viewed from the normal direction of the substrate 1. The source contact region 72s is a region electrically connected to the source electrode SE, and the drain contact region 72d is a region electrically connected to the drain electrode DE.

The gate insulating layer GI has a layered structure including a first insulating layer 8a disposed on the first region 71 and a second insulating layer 9 disposed on the first insulating layer 8a. The first insulating layer 8a is formed of a first insulating film L1, and the second insulating layer 9 is formed of a second insulating film L2. An insulating material of the first insulating film L1 and an insulating material of the second insulating film L2 may be the same, or may be different. In this example, the first insulating film L1 is a silicon oxide film, and the second insulating film L2 is a silicon nitride film.

When viewed from the normal direction of the substrate 1, the first insulating layer 8a overlaps with the first region 71 and does not overlap with the second region 72. The first insulating layer 8a may be in direct contact with the surface of the first region 71. On the other hand, when viewed from the normal direction of the substrate 1, the second insulating layer 9 overlaps with the first region 71 and at least a part of the second region 72. The second insulating layer 9 may be in direct contact with at least a part of the second region 72. In the illustrated example, the second insulating layer 9 covers a side surface and the upper surface of the first insulating layer 8a. The second insulating layer 9 may extend to the outside of the oxide semiconductor layer 7 when viewed from the normal direction of the substrate 1. The second insulating layer 9 may cover a side surface of the oxide semiconductor layer 7.

The second region (low-resistive region) 72 is formed, for example, by subjecting the oxide semiconductor layer 7 to resistance lowering processing such as plasma processing using the first insulating layer 8a as a mask. Details of the resistance lowering processing will be described below. When the second region 72 is formed by the resistance lowering processing using the first insulating layer 8a, a peripheral edge of the first insulating layer 8a and a boundary between the first region 71 and the second region 72 may be substantially aligned when viewed from the normal direction of the substrate 1.

When viewed from the normal direction of the substrate 1, the gate electrode GE is disposed on the gate insulating layer GI (here, on the second insulating layer 9) so as to overlap with at least a part of the first region 71 and not to overlap with the source contact region 72s and the drain contact region 72d. Of the first region 71, when viewed from the normal direction of the substrate 1, a portion 710 located between the source contact region 72s and the drain contact region 72d and overlapping with the gate electrode GE serves as a "channel region" where a channel of the TFT 101 is formed.

A width of the gate electrode GE in a channel length direction is preferably smaller than a width of the first region 71 in the channel length direction (i.e., a width of the first insulating layer 8a in the channel length direction). This allows the channel region 710 having a predetermined channel length to be formed in the first region 71 even when misalignment occurs.

In this example, the width of the gate electrode GE in the channel length direction is smaller than the width of the first region 71 in the channel length direction, and the gate electrode GE overlaps with only a part of the first region 71 when viewed from the normal direction of the substrate 1. In this case, when viewed from the normal direction of the substrate 1, the first region 71 has the channel region 710 that overlaps with the gate electrode GE and the first insulating layer 8a, and an offset region that does not overlap with the gate electrode GE but overlaps with the first insulating layer 8a. In the illustrated example, the first region 71 has a source-side offset region 711 and a drain-side offset region 712, respectively, on the source side and on the drain side of the channel region 710.

Note that depending on a position and a size of the gate electrode GE, the oxide semiconductor layer 7 may have an offset region on only one of the source side and the drain side of the channel region 710. Further, as described below, the oxide semiconductor layer 7 may have no offset region.

The gate electrode GE may be connected to the gate bus line GL, or may be a part of the gate bus line GL. In such a case, a portion of the gate bus line GL, which overlaps with the oxide semiconductor layer 7 when viewed from the normal direction of the substrate 1, is referred to as the "gate electrode GE".

The source electrode SE of the TFT 101 is formed in the first metal layer M1, and is electrically connected to a corresponding source bus line SL. The source electrode SE may be integrally formed with the source bus line SL. The source electrode SE may be connected to the source bus line SL, or may be a part of the source bus line SL. In such a case, a portion of the source bus line SL, which is connected to the source contact region 72s of the oxide semiconductor layer 7, is referred to as the "source electrode SE". The first metal layer M1 is covered by the lower insulating layer 5. The oxide semiconductor layer 7 is disposed on the lower insulating layer 5.

The source contact region 72s of the oxide semiconductor layer 7 is electrically connected to a corresponding source bus line SL. In this example, a source opening 5p for exposing a part of the source electrode SE (here, a part of the source bus line SL) is formed in the lower insulating layer 5. A part of the second region 72 (the source contact region 72s) of the oxide semiconductor layer 7 is electrically connected to the source electrode SE in the source opening 5p. The oxide semiconductor layer 7 may come into direct contact with an exposed portion of the source electrode SE.

The TFT 101 may include a conductive layer 3 that functions as a light blocking layer on the substrate 1 side of the oxide semiconductor layer 7. The conductive layer 3 is formed in the same first metal layer M1 as the source bus line SL, for example. The conductive layer 3 may be disposed to overlap with at least the channel region 710 of the oxide semiconductor layer 7 when viewed from the normal direction of the substrate 1. In this manner, deterioration of characteristics of the oxide semiconductor layer 7 caused by light (light of a backlight) from the substrate 1 side can be prevented. The conductive layer 3 may be electrically in a floating state or may be fixed to the GND potential (0 V). Alternatively, the conductive layer 3 may function as a lower gate electrode by being electrically connected to the gate electrode GE by a connecting portion (not illustrated).

The oxide semiconductor layer 7, the gate insulating layer GI, and the gate electrode GE are covered by the upper insulating layer 13. The upper insulating layer 13 includes an inorganic insulating layer (a passivation film) 11, for example. As illustrated in the drawing, the upper insulating layer 13 may have a layered structure including the inorganic insulating layer 11 and an organic insulating layer 12 formed on the inorganic insulating layer 11. The organic insulating layer 12 need not be formed. Alternatively, the organic insulating layer 12 may be formed only in the display region.

The pixel electrode PE and the common electrode CE are disposed above the upper insulating layer 13 so as to partially overlap with each other with a dielectric layer 17 interposed therebetween. In this example, the common electrode CE formed of a first transparent conductive film is disposed on the upper insulating layer 13. The pixel electrode PE formed of a second transparent conductive film is disposed on the common electrode CE with the dielectric layer 17 interposed therebetween. Although not illustrated, the common electrode CE formed of the second transparent conductive film may be disposed on the pixel electrode PE formed of the first transparent conductive film with the dielectric layer 17 interposed therebetween. Herein, a layer T1 including electrodes and wiring lines formed using the first transparent conductive film is referred to as a "first transparent conductive layer", and a layer T2 including electrodes and wiring lines formed using the second transparent conductive film is referred to as a "second transparent conductive layer". In each pixel area PIX, of the pixel electrode PE and the common electrode CE, in an electrode (here, the pixel electrode PE) formed in the second transparent conductive layer T2, one or a plurality of slits (openings) or notched portions are provided.

The pixel electrode PE is disposed for each pixel area PIX. The pixel electrode PE is electrically connected to the oxide semiconductor layer 7 of the TFT 101 in a pixel contact portion. In the present example, in the pixel contact portion, a pixel contact hole CHp for exposing the drain contact region 72d of the oxide semiconductor layer 7 is formed in the dielectric layer 17, the upper insulating layer 13, and the second insulating layer 9. The pixel electrode PE is electrically connected to the drain contact region 72d of the oxide semiconductor layer 7 in the pixel contact hole CHp. The pixel electrode PE may be in direct contact with the oxide semiconductor layer 7. In other words, a portion of the pixel electrode PE, which is in contact with the oxide semiconductor layer 7, may also function as the drain electrode. Note that, as described below, the TFT 101 includes the drain electrode DE provided on the substrate 1 side of the pixel electrode PE, and the oxide semiconductor layer 7 and the pixel electrode PE may be electrically connected with the drain electrode DE interposed therebetween.

The common electrode CE need not necessarily be separated for each pixel area PIX. For example, the common electrode CE may have an opening 15p in a region in which the pixel contact portion is formed, and may be formed across the entire pixel area PIX except the pixel contact portion.

Advantageous Effects

According to the present embodiment, when the two insulating films L1, L2 constituting the gate insulating layer GI are formed separately, leakage between the gate and the source/drain caused by foreign matter or a defect portion in the gate insulating layer GI can be suppressed.

As described above, when foreign matter or a defect portion is present in the gate insulating layer due to the manufacturing process, leakage can occur between the gate of the TFT and the source/drain. This problem may occur not only in a case where the gate insulating layer is a single layer, but also in a case where the gate insulating layer has a layered structure.

Figure 22:
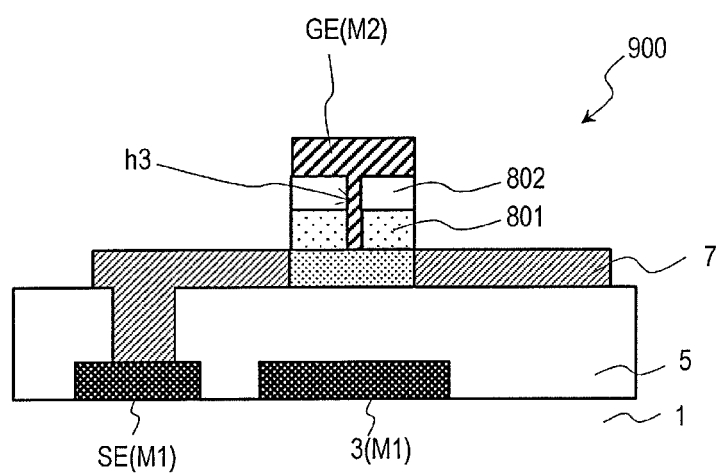
FIG. 22 is a cross-sectional view exemplifying a pixel TFT in a case where a defect portion occurs in a gate insulating layer in an active matrix substrate 900 of a reference example.

FIG. 22 is a cross-sectional view illustrating a TFT 900 of a reference example provided with a gate insulating layer having a layered structure. A gate insulating layer GI of the TFT 900 has a layered structure including insulating layers 801, 802. The insulating layers 801, 802 are, for example, obtained by continuously forming two insulating films in an identical film formation apparatus and simultaneously patterning the insulating films (using an identical mask). Due to this, in a manufacturing process of a gate insulating layer GI, when foreign matter enters a portion of the gate insulating layer GI, which is located between an oxide semiconductor layer 7 and a gate electrode GE, a defect portion h3 caused by the foreign matter may be formed across the two insulating layers 801, 802. As a result, leakage may occur between the gate electrode GE and a source electrode SE or a drain electrode via the defect portion h3 of the gate insulating layer GI and the oxide semiconductor layer 7.

In contrast, in the present embodiment, the first insulating film L1 is formed and patterned to form the first insulating layer 8a, and then the second insulating film L2 serving as the second insulating layer 9 is formed. When the first insulating layer 8a and the second insulating layer 9 are formed and patterned separately, even if a defect portion caused by foreign matter occurs in any one of the insulating films, an insulating property between the gate electrode GE and the oxide semiconductor layer 7 can be ensured by the other of the insulating films. This can suppress leakage caused by foreign matter or a defect.

Figure 3A:
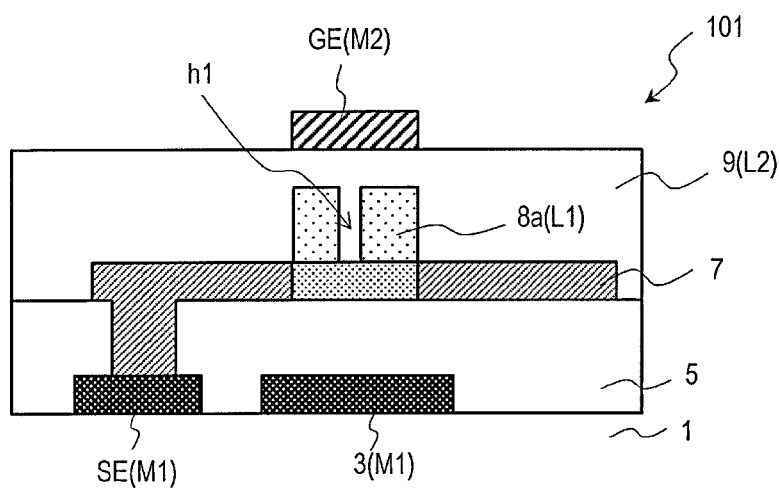
FIG. 3A is a cross-sectional view exemplifying a TFT 101 in a case where a defect portion occurs in a first insulating layer 8a of a gate insulating layer GI in the active matrix substrate 1001.
Figure 3B:
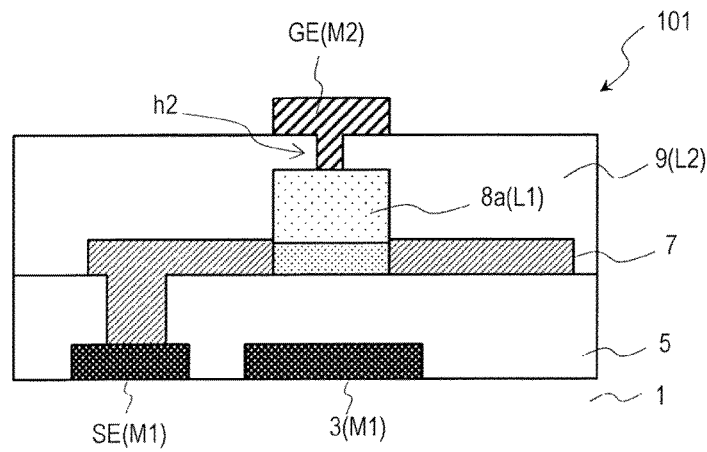
FIG. 3B is a cross-sectional view exemplifying the TFT 101 in a case where a defect portion occurs in a second insulating layer 9 of the gate insulating layer GI in the active matrix substrate 1001.

FIG. 3A is a cross-sectional view exemplifying the TFT 101 in a case where a defect portion occurs in the first insulating layer 8a constituting the gate insulating layer GI, and FIG. 3B is a cross-sectional view exemplifying the TFT 101 in a case where a defect portion occurs in the second insulating layer 9 constituting the gate insulating layer GI.

As illustrated in FIG. 3A, even if a defect portion h1 is formed in the first insulating layer 8a, the second insulating layer 9 is formed so as to cover the first insulating layer 8a having the defect portion h1, and thus the insulating property between the gate electrode GE and the oxide semiconductor layer 7 is ensured by the second insulating layer 9. On the other hand, as illustrated in FIG. 3B, after the first insulating layer 8a is formed, even if a defect portion h2 caused by foreign matter is formed in the second insulating layer 9 at the time of forming the second insulating layer 9, the insulating property is ensured by the first insulating layer 8a.

The second insulating layer 9 may cover the entire upper surface and side surface of the first insulating layer 8a. This makes it possible to more effectively suppress occurrence of leakage due to foreign matter or a defect in the first insulating layer 8a.

Although not illustrated in FIG. 2A, in addition to the pixel TFT or instead of the pixel TFT, some or all of the plurality of circuit TFTs each may be a top gate type oxide semiconductor TFT provided with the gate insulating layer GI having the layered structure as described above.

Intersection R

In the active matrix substrate 1001, when viewed from the normal direction of the substrate 1, each source bus line SL extends in the second direction intersecting with the plurality of gate bus lines GL extending in the first direction. A portion R where one of the source bus lines SL intersects with one of the gate bus lines GL will be referred to as an "intersection".

As illustrated in FIG. 2C, in the intersection R, an insulating layer 8b formed of the first insulating film L1 may be disposed between the source bus line SL and the gate bus line GL. The insulating layer 8b has a pattern having an island shape with a width in the first direction larger than the width of the source bus line SL and a width in the second direction larger than the width of the gate bus line GL, for example. As a result, in addition to the lower insulating layer 5 and the second insulating layer 9, the insulating layer 8b can be interposed between the source bus line SL and the gate bus line GL, and thus an overlap capacitance Cgs between the gate bus line GL and the source bus line SL can be reduced. In addition, according to the present embodiment, the insulating layer 8b can be formed simultaneously with the first insulating layer 8a by patterning the first insulating film L1. As such, the capacitance Cgs of the intersection R can be reduced without increasing the number of manufacturing processes.

First Insulating Film L1 and Second Insulating Film L2

As the first insulating film L1 serving as the first insulating layer 8a and the second insulating film L2 serving as the second insulating layer 9, a silicon oxide (SiOx) layer, a silicon nitride (SiNx) layer, a silicon oxynitride (SiOxNy; x>y) layer, a silicon nitride oxide (SiNxOy; x>y) layer, or the like may be used as appropriate. The first insulating film L1 and the second insulating film L2 may each be a single layer or may each have a layered structure.

The first insulating film L1 and the second insulating film L2 may include an identical insulating material or may include different insulating materials. Even if the insulating material is identical, it is possible to suppress leakage due to foreign matter or a defect by being separately formed as described above.

The first insulating film L1 may be an oxygen-donating film capable of supplying oxygen. Alternatively, the first insulating film L1 may be a layered film having an oxygen-donating film as a lower layer. Examples of the oxygen-donating film include an oxide film such as a silicon oxide film or a silicon oxynitride film. When the first insulating layer 8a is formed of such a first insulating film L1, oxygen deficiency generated in the first region 71 of the oxide semiconductor layer 7 can be reduced by the oxide film. In this manner, it is possible to suppress resistance lowering of the first region 71 (in particular, the channel region 710), so that off-state leakage can be reduced.

The second insulating film L2 may be an insulating layer capable of reducing the oxide semiconductor included in the oxide semiconductor layer 7. For example, the second insulating film L2 may be a hydrogen-donating film capable of supplying hydrogen. Examples of the hydrogen-donating film include a nitride film such as a silicon nitride film or silicon nitride oxide film. Among these, the silicon nitride film has a high withstand voltage and a high electro-static discharge (ESD) resistance. In addition, the silicon nitride film has an excellent coverage property. When the second insulating layer 9 is formed of such a second insulating film L2, the oxide semiconductor in the second region 72 of the oxide semiconductor layer 7 can be reduced, so that it is possible to keep the resistance of the second region 72 low. Furthermore, when the hydrogen-donating film is used to form the second insulating layer 9 so as to be in direct contact with a part of the oxide semiconductor layer 7, a resistance of a portion of the oxide semiconductor layer 7 that is in contact with the second insulating layer 9 can be caused to be lower than a resistance of a portion of the oxide semiconductor layer 7 that is not in contact with the second insulating layer 9 (a portion covered by the first insulating layer 8a) even without performing resistance lowering processing such as plasma processing.

Suitable thicknesses of the first insulating film L1 and the second insulating film L2 may vary depending on the use of each TFT, the materials of the first insulating film L1 and the second insulating film L2, the material of the oxide semiconductor layer 7, and the like. The thickness of the first insulating film L1 and the thickness of the second insulating film L2, that is, the thicknesses of the first insulating layer 8a and the second insulating layer 9, may be adjusted in such a manner that the thickness of the entire gate insulating layer GI (the total thickness of the first insulating layer 8a and the second insulating layer 9 in the illustrated example) is 100 nm or more and 250 nm or less, for example, about 200 nm. In a case where the first insulating layer 8a is a silicon oxide layer and the second insulating layer 9 is a silicon nitride layer, the second insulating layer 9 may be thinner than the first insulating layer 8a. The thickness of the first insulating layer 8a may be, for example, 50 nm or more and 200 nm or less. The thickness of the second insulating layer 9 may be, for example, 50 nm or more and 100 nm or less.

Shape of First Insulating Layer 8a

In the example illustrated in FIGS. 2A and 2C, the first insulating layer 8a and the insulating layer 8b are separated (spaced apart), but the first insulating layer 8a and the insulating layer 8b may be connected. In other words, the first insulating layer 8a may extend from the channel portion of the TFT 101 to the intersection R.

Figure 4A:
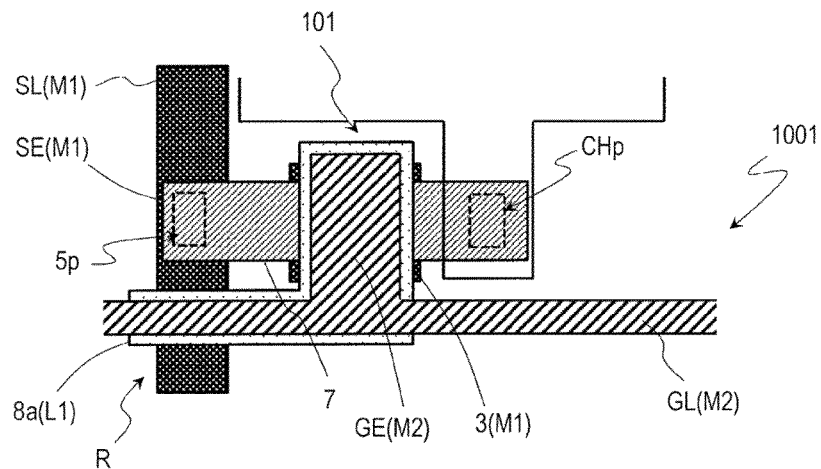
Figure 4B:
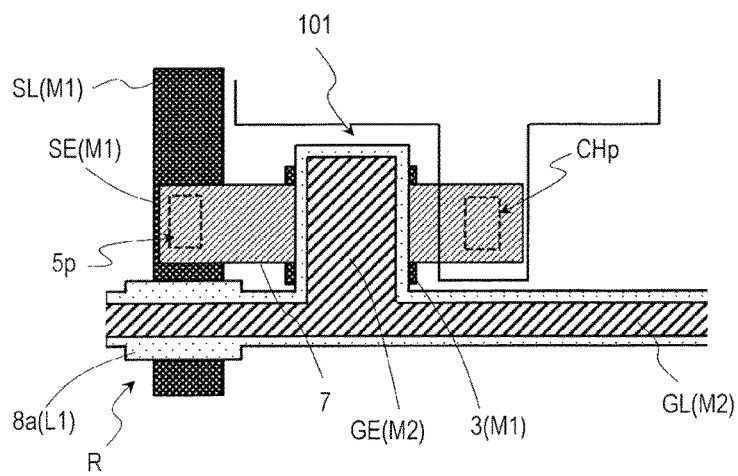
Figure 4C:
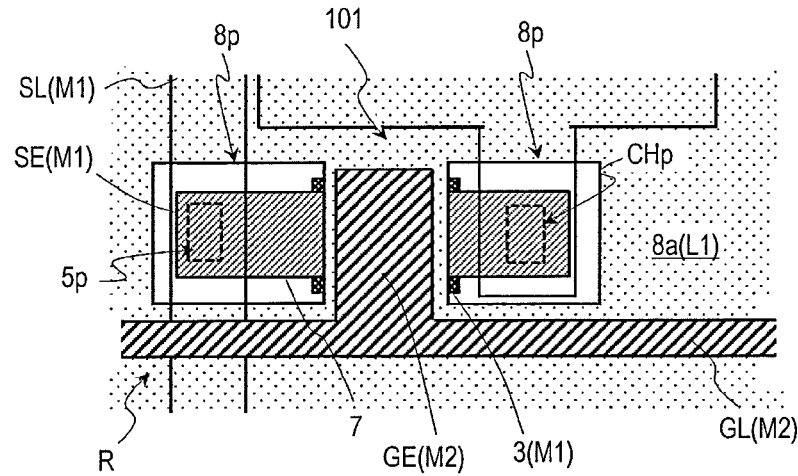

FIGS. 4A to 4C are plan views each illustrating another example of the planar shape of the first insulating layer 8a.

As illustrated in FIG. 4A, when viewed from the normal direction of the substrate 1, the first insulating layer 8a may extend between the gate bus line GL and the substrate 1 from the first region 71 of the oxide semiconductor layer 7 to the intersection R. In this example, the first insulating layer 8a is provided for each pixel area, and the first insulating layers 8a of two adjacent pixel areas are separated from each other. When viewed from the normal direction of the substrate 1, an edge of a portion of the gate bus line GL, which is located above the first insulating layer 8a, may be located inside the first insulating layer 8a. This can reduce irregularities of a base surface of the gate bus line GL (a step caused by presence or absence of the first insulating film L1), so that it is possible to reduce steps of the gate bus line GL to improve the coverage.

The first insulating layer 8a may extend across a plurality of pixel areas. For example, as illustrated in FIG. 4B, the first insulating layer 8a may extend across two or more pixel areas adjacent to each other in the first direction between the gate bus line GL and the substrate 1. The first insulating layer 8a may extend over the entire display region in the first direction. In other words, first insulating layers 8a are provided for respective gate bus lines GL, and first insulating layers 8a located below gate bus lines GL adjacent to each other may be separated from each other. When viewed from the normal direction of the substrate 1, an edge of the gate bus line GL (in this example, edges of the gate bus line GL and the gate electrode GE) may be located inside the first insulating layer 8a. This makes it possible to further reduce the steps generated in the gate bus line GL while reducing the capacitance of the intersection.

Alternatively, as illustrated in FIG. 4C, the first insulating layer 8a may extend across a plurality of pixel areas adjacent to each other in the first direction and the second direction. The first insulating layer 8a may be formed in a substantial entirety of the display region except a region including the second region 72 of each TFT 101. Such a first insulating layer 8a is obtained by forming the first insulating film L1 and then forming an opening 8p in the first insulating film L1 for exposing both sides of a portion serving as a channel region of the oxide semiconductor layer 7 of each TFT 101.

Another TFT Structure

Figure 5A:
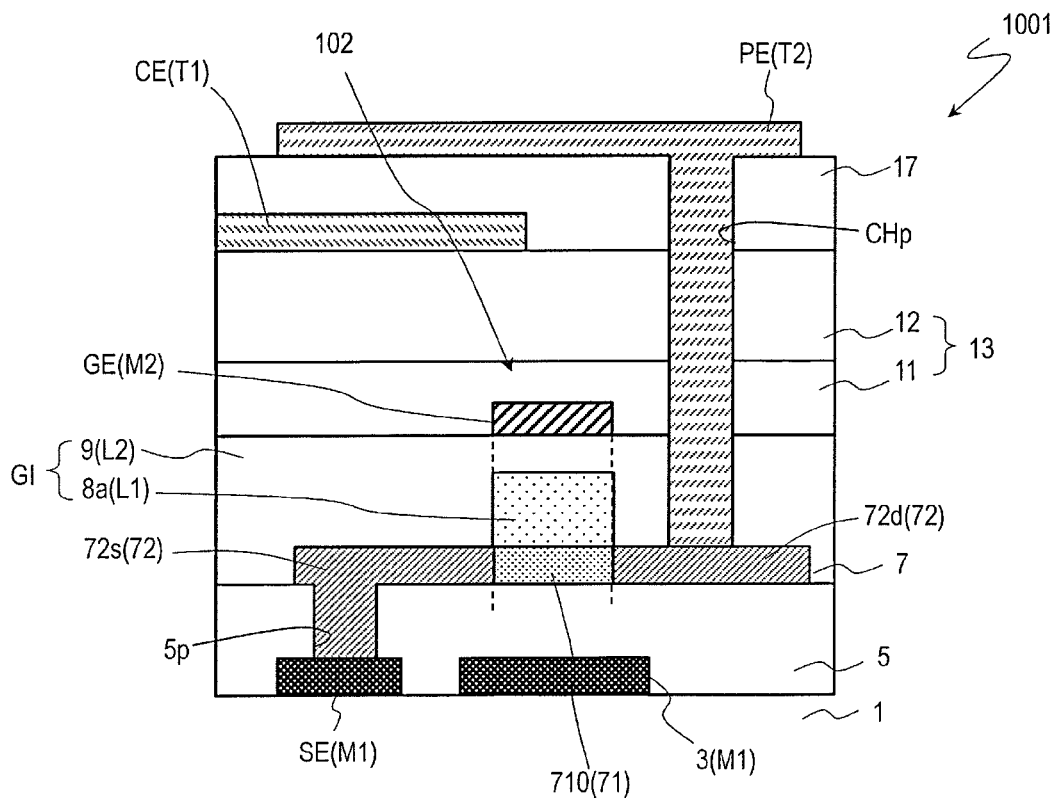
FIG. 5A is a cross-sectional view exemplifying another TFT 102 in the active matrix substrate 1001.
Figure 5B:
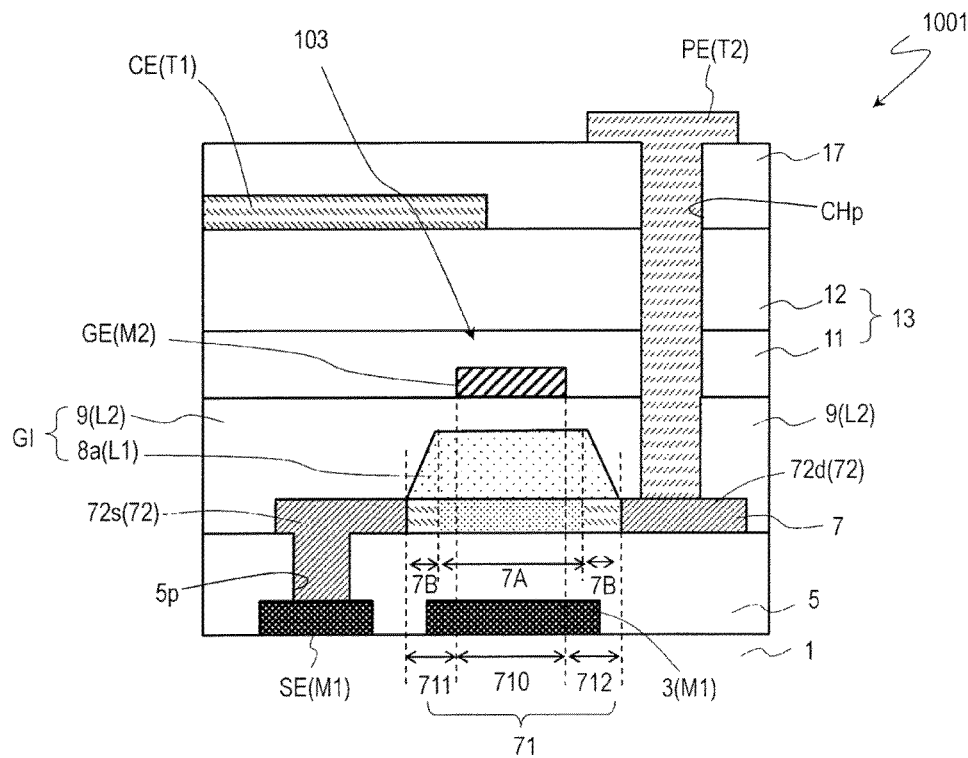
FIG. 5B is a cross-sectional view exemplifying another TFT 103 in the active matrix substrate 1001.
Figure 5C:
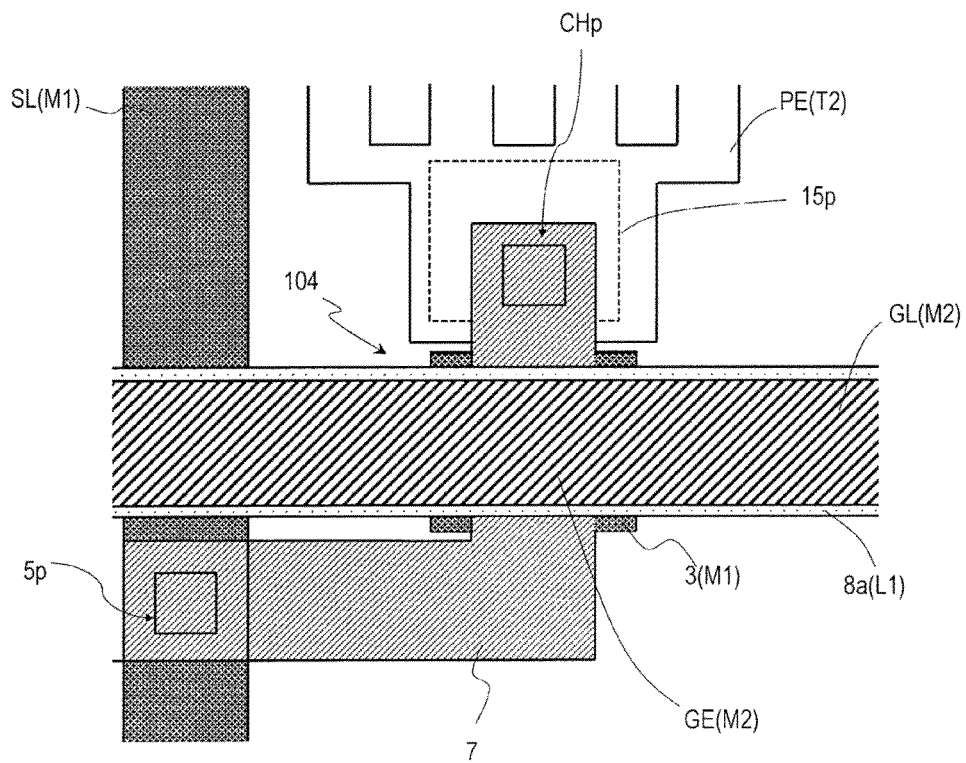
FIG. 5C is a plan view illustrating yet another TFT 104 in the active matrix substrate 1001.

FIGS. 5A, 5B, and 5C are cross-sectional views exemplifying other TFT 102, TFT 103, and TFT 104, in the active matrix substrate 1001, respectively.

As illustrated in FIG. 5A, when viewed from the normal direction of the substrate 1, the gate electrode GE and the first region 71 may be substantially aligned in the TFT 102. In this case, the entire first region 71 serves as the channel region 710, and no offset region is formed.

The TFT 103 illustrated in FIG. 5B is different from the TFT 101 in that the first region 71 has a portion (hereinafter, referred to as a "side portion") 71B having a specific resistance lower than a specific resistance of the channel region 710 and higher than a specific resistance of the second region 72, between the channel region 710 and the second region 72.

In the TFT 103, the first insulating layer 8a has a tapered portion on the side surface thereof. The first region 71 of the oxide semiconductor layer 7 includes a main portion 71A that overlaps with the upper surface of the first insulating layer 8a and the side portion 71B that overlaps with the tapered portion, when viewed from the normal direction of the substrate 1. The specific resistance of the side portion 71B is lower than a specific resistance of the main portion 71A and higher than the specific resistance of the second region 72.

The main portion 71A includes the channel region 710. At least a part of the side portion 71B is an offset region (i.e., a region that does not overlap with the gate electrode GE when viewed from the normal direction of the substrate 1). The entire side portion 71B may be the offset region. The side portion 71B has a function similar to that of the LDD region in the silicon TFT, and thus a leakage current can be suppressed by providing the side portion 71B.

The main portion 71A and the side portion 71B are formed by performing resistance lowering of the oxide semiconductor layer 7 using the first insulating layer 8a as a mask, for example. A method and a condition for resistance lowering of the oxide semiconductor layer 7, the thickness, material, a tapered shape of the first insulating layer 8a, and the like are adjusted by utilizing a difference in function as a mask between the tapered portion of the first insulating layer 8a having a relatively small thickness and a thick portion other than the tapered portion in such a manner that regions having different resistances are formed in the first region 71. The method for resistance lowering may be plasma processing, or a method for resistance lowering by using the hydrogen-donating film (the second insulating layer 9) to reduce the oxide semiconductor.

The TFT 104 exemplified in FIG. 5C differs from the other TFTs described above in the channel length direction. While in the examples described above, the channel length direction of the pixel TFT is substantially parallel to the gate bus line GL (substantially parallel to the first direction), the channel length direction of the TFT 104 is, for example, substantially parallel to the source bus line SL (substantially parallel to the second direction). In this case, the oxide semiconductor layer may extend from the corresponding pixel area across the gate bus line GL to a pixel area adjacent in the second direction. In FIG. 5C, when viewed from the normal direction of the substrate 1, the first insulating layer 8a extends between the gate bus line GL and the substrate 1 in the first direction. Note that the planar shape of the first insulating layer 8a is not limited thereto, and the first insulating layer 8a may have shapes similar to those in FIGS. 4A to 4C. Furthermore, FIG. 5C has a bottom source wiring line structure, but the source bus line SL may be formed in an upper layer with respect to the gate bus line GL.

First Modification Example

Figure 6A:
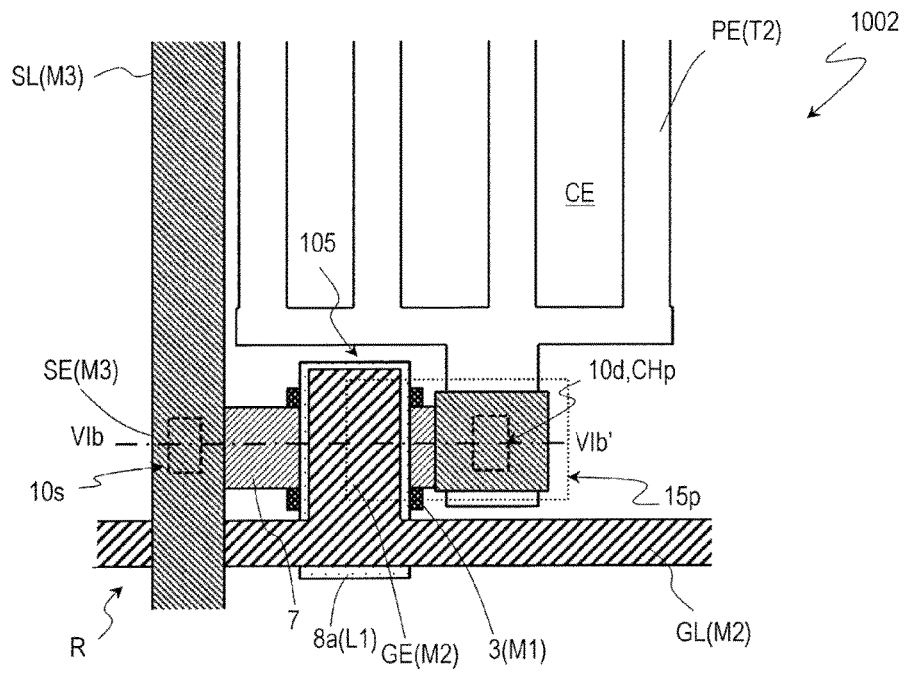
FIG. 6A is a plan view exemplifying one pixel area PIX in an active matrix substrate 1002.
Figure 6B:
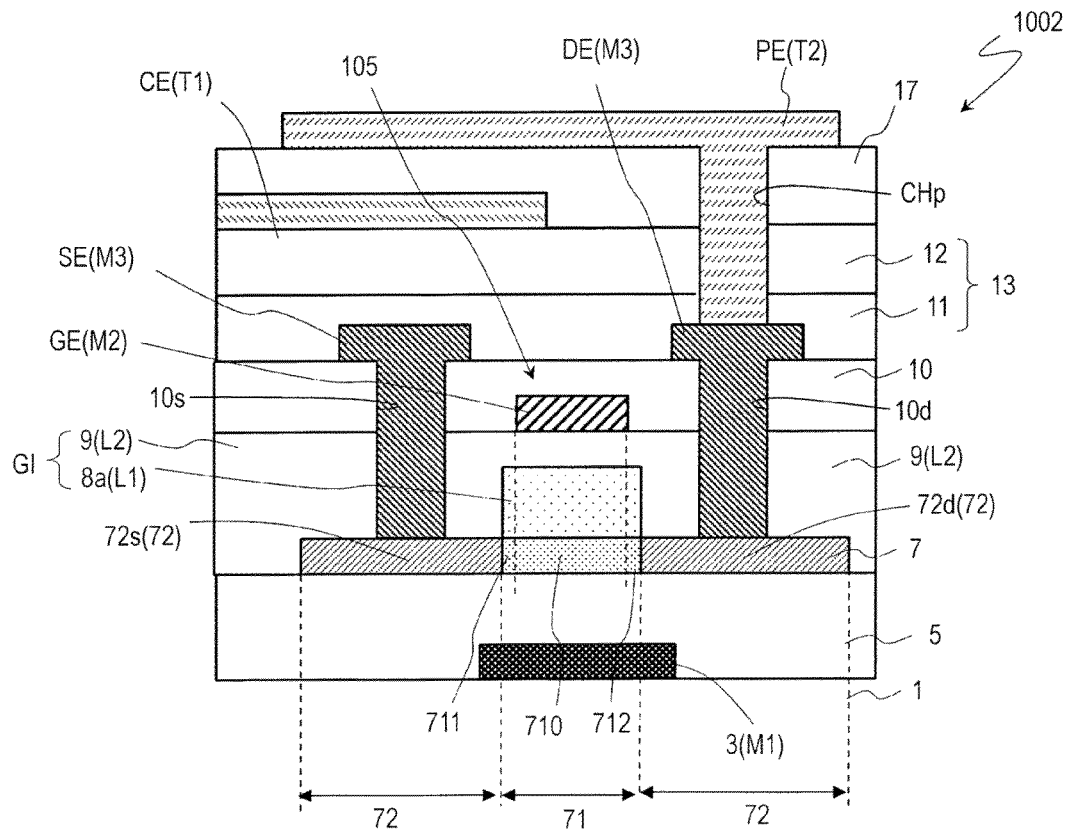
FIG. 6B is a cross-sectional view taken along a line VIb-VIb' in FIG. 6A.

FIG. 6A is a plan view exemplifying one pixel area PIX in an active matrix substrate 1002. FIG. 6B is a cross-sectional view taken along a line VIb-VIb' in FIG. 6A, illustrating a cross-sectional structure of a TFT (pixel TFT) 105 formed in the pixel area PIX.

The active matrix substrate 1002 differs from the active matrix substrate 1001 in that the source bus line SL is provided in an upper layer with respect to the gate bus line GL and the oxide semiconductor layer 7. Hereinafter, points different from the active matrix substrate 1001 will be only described, and the description of the same structure will be omitted.

First, a layer structure of the active matrix substrate 1002 will be described. The active matrix substrate 1002 includes a first metal layer M1, a lower insulating layer 5, an oxide semiconductor film, a first insulating film L1, a second insulating film L2, a second metal layer M2, an interlayer insulating layer 10, a third metal layer M3, and an upper insulating layer 13 in this order from the substrate 1 side. The first metal layer M1 includes a light blocking layer of each pixel TFT. Other wiring lines such as a touch wiring line may be formed in the first metal layer M1. The second metal layer M2 is a gate metal layer including a plurality of gate bus lines GL and gate electrodes GE of the respective pixel TFTs, similarly to the active matrix substrate 1001. The third metal layer M3 disposed on the second metal layer M2 with the interlayer insulating layer 10 interposed therebetween is a source metal layer including a plurality of source bus lines SL and source electrodes of the respective pixel TFTs. The third metal layer M3 may further include drain electrodes DE of the respective pixel TFTs.

The TFT 105 of the active matrix substrate 1002 includes an oxide semiconductor layer 7 disposed on the lower insulating layer 5, a gate electrode GE disposed on a part of the oxide semiconductor layer 7 with a gate insulating layer GI interposed therebetween, a source electrode SE, and a drain electrode DE. A conductive layer 3 may be further provided on the substrate 1 side of the lower insulating layer 5. The TFT 105 includes the source electrode SE and the drain electrode DE in the second metal layer M2 which is an upper layer with respect to the oxide semiconductor layer 7 and the gate electrode GE. The structure and material of the gate insulating layer GI, the oxide semiconductor layer 7, and the conductive layer 3 are similar to those of the active matrix substrate 1001.

In the present modification example, in the intersection R, the lower insulating layer 5, the second insulating layer 9, and the interlayer insulating layer 10 are located between the source bus line SL and the gate bus line GL, so that the overlap capacitance Cgs is reduced. Thus, no insulating layer formed of the first insulating film L1 is not disposed in the intersection R. Note that, as illustrated in FIG. 2A and the like, the insulating layer 8b formed of the first insulating film L1 may be further disposed in the intersection R. As illustrated in FIGS. 3B and 3C, the first insulating layer 8a may extend across a plurality of pixel areas PIX.

In the active matrix substrate 1002, the interlayer insulating layer 10 is formed on the second metal layer M2. The interlayer insulating layer 10 covers the second insulating layer 9 and the second metal layer M2 including the gate electrodes GE.

The source electrode SE and the drain electrode DE are arranged on the interlayer insulating layer 10. In this example, the source electrode SE and the drain electrode DE are formed by using a conductive film identical to that of the source bus line SL (that is, in the third metal layer M3). The source electrode SE is electrically connected to the corresponding source bus line SL. As illustrated, the source electrode SE may be a part of the source bus line SL. The drain electrode DE is electrically connected to the corresponding pixel electrode PE.

A first opening 10s that exposes a part (a source contact region 72s) of the second region 72 of the oxide semiconductor layer 7 and a second opening 10d that exposes another part (a drain contact region 72d) of the second region 72 are provided in the interlayer insulating layer 10. The source electrode SE is disposed on the interlayer insulating layer 10 and in the first opening 10s, and is connected to the source contact region 72s in the first opening 10s. The drain electrode DE is disposed on the interlayer insulating layer 10 and in the second opening 10d, and is connected to the drain contact region 72d in the second opening 10d.

Note that the TFT 105 need not include the drain electrode DE in the third metal layer M3. For example, similarly to the active matrix substrate 1001, the pixel electrode PE may be in direct contact with the oxide semiconductor layer 7.

Second Modification Example

Figure 7A:
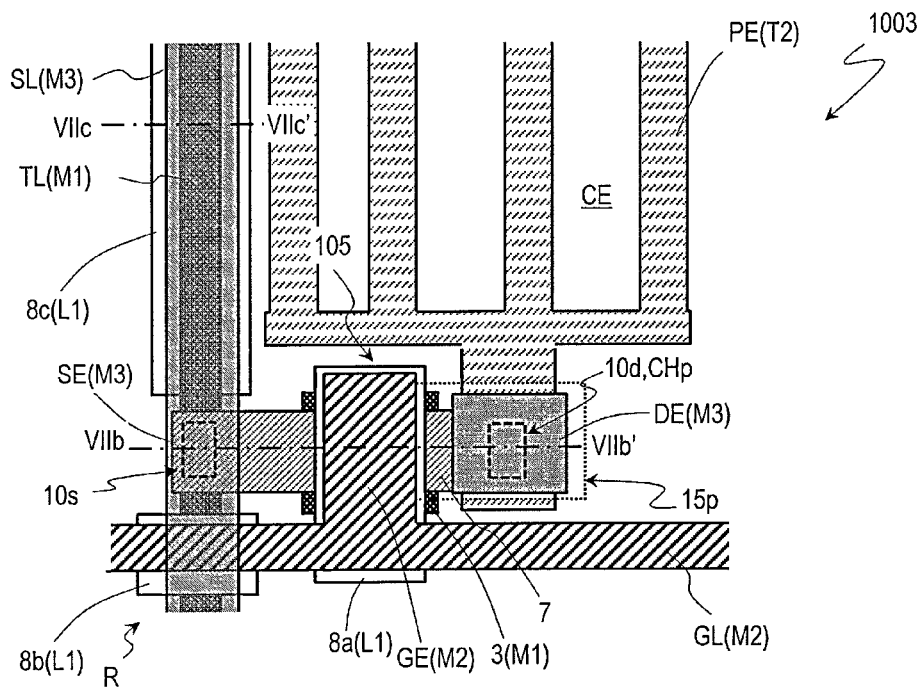
FIG. 7A is a plan view exemplifying one pixel area PIX in an active matrix substrate 1003.
Figure 7B:
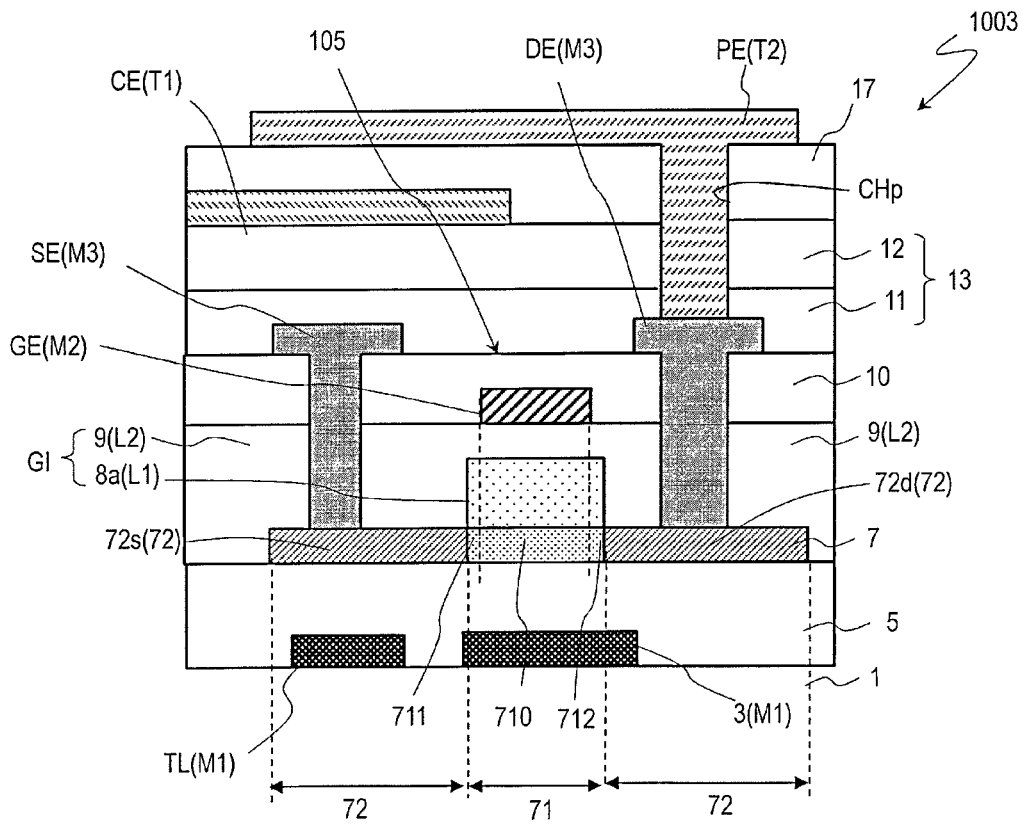
FIG. 7B is a cross-sectional view taken along a line VIIb-VIIb' in FIG. 7A.
Figure 7C:
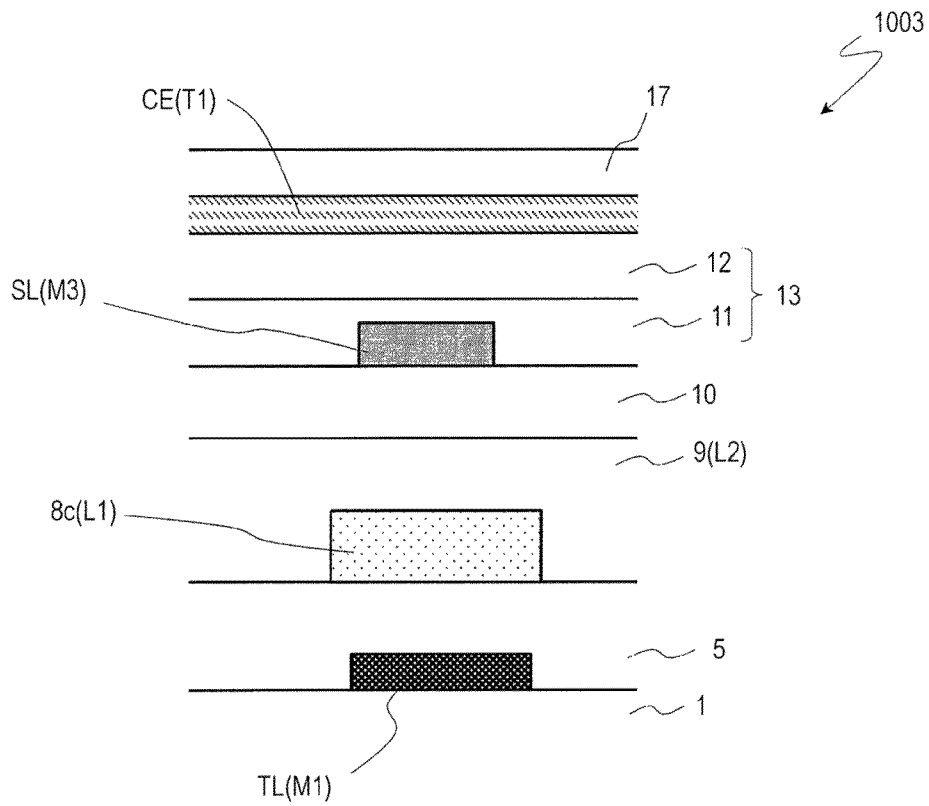
FIG. 7C is a cross-sectional view taken along a line VIIc-VIIc' in FIG. 7A.

FIG. 7A is a plan view exemplifying one pixel area PIX in an active matrix substrate 1003. FIG. 7B is a cross-sectional view taken along a line VIIb-VIIb' in FIG. 7A, illustrating a cross-sectional structure of a TFT (pixel TFT) 105 formed in the pixel area PIX. FIG. 7C is a cross-sectional view taken along a line VIIc-VIIc' in FIG. 7A, illustrating a cross-sectional structure of a touch wiring line TL and a source bus line SL.

The active matrix substrate 1003 is a substrate applied to an in-cell touch panel type display device, and includes electrodes and wiring lines for a touch sensor. Herein, regardless of whether the touch sensor is of a self-capacitive type or of a mutual capacitive type, the electrode for the touch sensor disposed on the active matrix substrate side is simply referred to as the "touch sensor electrode", and the wiring line for the touch sensor electrically connected to the touch sensor electrode is referred to as the "touch wiring line".

The active matrix substrate 1003 further includes a plurality of touch wiring lines TL and a plurality of touch sensor electrodes. Each touch electrode is connected to one corresponding touch wiring line TL.

Each touch sensor electrode is disposed correspondingly to a plurality of pixel areas, for example. A common electrode CE may be separated into a plurality of segments, and each segment may function as the touch sensor electrode. In this case, it may be configured that switching be performed in a time division manner between a display mode in which the plurality of segments function as the common electrode CE and a touch detection mode in which the plurality of segments function as the touch sensor electrodes. In the display mode, a common signal is applied to the common electrode CE via the touch wiring lines TL, and in the touch detection mode, a touch drive signal is applied to the touch sensor electrodes (each segment of the common electrode CE) via the touch wiring lines TL.

In the present modification example, the touch wiring lines TL are formed in the first metal layer M1. Each touch wiring line TL extends in the second direction so as to at least partially overlap with one of the plurality of source bus lines SL, for example.

In addition, in the present modification example, a first insulating layer 8a disposed on the first region 71 of each TFT 105, an insulating layer 8b disposed in each intersection R, and an insulating layer 8c disposed between each touch wiring line TL and the source bus line SL are formed of the first insulating film L1. Thus, the insulating layer 8c formed of the first insulating film L1 and the second insulating layer 9 extending on the insulating layer 8c are located between each touch wiring line TL and the source bus line SL. When the insulating layer 8c is disposed between the touch wiring line TL and the source bus line SL, a capacitance between the source bus line SL and the touch wiring line TL can be reduced.

When viewed from the normal direction of the substrate 1, an edge of the source bus line SL, which is located above the insulating layer 8c, may be located inside the insulating layer 8c (inside an edge of the insulating layer 8c). This makes it possible to suppress occurrence of a step in the source bus line SL caused by the insulating layer 8c.

Although in the active matrix substrate 1003, the touch wiring lines TL are formed in the first metal layer M1, the source bus lines SL may be formed in the first metal layer M1 (bottom source wiring line structure), and the touch wiring lines TL may be formed in other metal layers (e.g., the third metal layer M3) located above the second metal layer M2. A metal layer for forming the touch wiring lines TL may be separately provided. Also in such a case, an overlap capacitance can be reduced by disposing an insulating layer formed of the first insulating film L1 between the touch wiring lines TL and the source bus lines SL.

Specific structures, driving methods, and the like of the mutual capacitive and self-capacitive touch sensors are described in, for example, JP 2018-5484 A, WO 2018/092758 A, WO 2017/126603 A, JP 2016-126336 A, and the like and are publicly known, so detailed description thereof is omitted. The entire contents of the disclosures of JP 2018-5484 A, WO 2018/092758 A, WO 2017/126603 A, and JP 2016-126336 A are incorporated herein by reference.

Method for Manufacturing Active Matrix Substrate 1001

A method for manufacturing an active matrix substrate of the present embodiment will be described by taking the active matrix substrate 1001 as an example.

Figure 18:
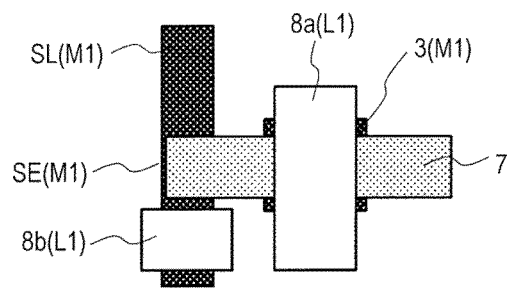
FIG. 18 is a process plan view illustrating the method for manufacturing the active matrix substrate 1001.
Figure 19:
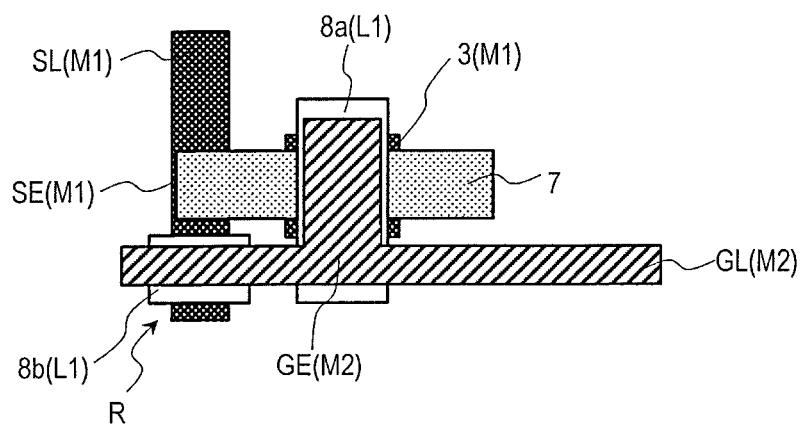
FIG. 19 is a process plan view illustrating the method for manufacturing the active matrix substrate 1001.
Figure 20:
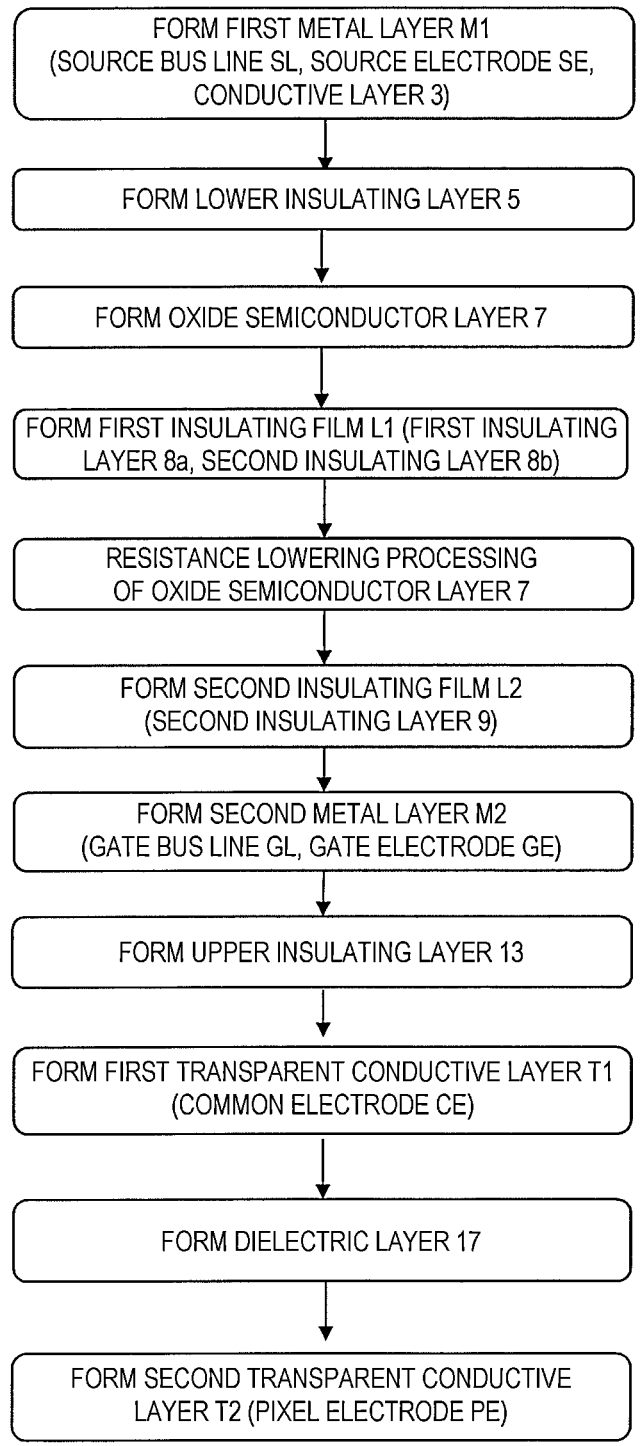
FIG. 20 is a flowchart illustrating an example of the method for manufacturing the active matrix substrate 1001.

FIGS. 8 to 17 are process cross-sectional views for explaining the method for manufacturing the active matrix substrate 1001. FIGS. 18 and 19 are process plan views corresponding to FIGS. 11 and 14, respectively. FIG. 20 is a diagram illustrating a process flow. The following will describe a manufacturing method of one unit region out of a plurality of unit regions in the active matrix substrate 1001.

STEP 1: Forming First Metal Layer M1 (FIG. 8)

A first conductive film (having a thickness of 50 nm or more and 500 nm or less, for example) is formed on the substrate 1 by sputtering method, for example. Next, the first conductive film is patterned by a known photolithography process. Here, a resist film is formed on the first conductive film and the resist film is exposed to light by using a first photomask to form a first resist layer (not illustrated). Etching (for example, wet etching) of the first conductive film is performed, using the first resist layer as a mask.

Figure 8:
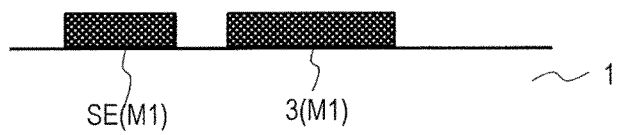
FIG. 8 is a process cross-sectional view illustrating a method for manufacturing the active matrix substrate 1001.

In this manner, as illustrated in FIG. 8, the first metal layer M1 including the source bus line SL, the source electrode SE of each TFT, and the conductive layer 3 functioning as the light blocking layer of each TFT is formed.

As the substrate 1, a transparent substrate with insulating properties, for example, a glass substrate, a silicon substrate, a heat-resistant plastic substrate (resin substrate), or the like can be used.

The material of the first conductive film is not particularly limited, and for example, a film containing a metal such as aluminum (Al), tungsten (W), molybdenum (Mo), tantalum (Ta), chromium (Cr), titanium (Ti), and copper (Cu), an alloy thereof, or a metal nitride thereof can be appropriately used. Further, a layered film obtained by layering such a plurality of films may be used. Here, as the first conductive film, a layered film having Ti as a lower layer and Cu as an upper layer is used.

STEP 2: Forming Lower Insulating Layer 5 (FIG. 9)

Figure 9:
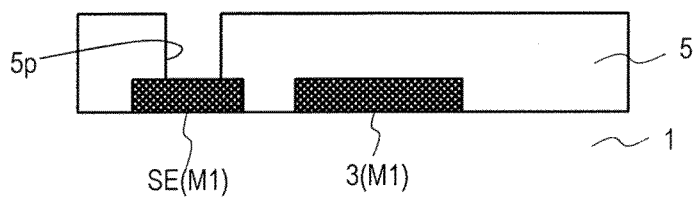
FIG. 9 is a process cross-sectional view illustrating the method for manufacturing the active matrix substrate 1001.

Next, as illustrated in FIG. 9, the lower insulating layer 5 (having a thickness of, for example, 200 nm or more and 600 nm or less) is formed to cover the first metal layer M1. Subsequently, patterning of the lower insulating layer 5 is performed by a known photolithography process. In this manner, in each pixel area, the source opening 5p for exposing a part of the source electrode SE (or the source bus line SL) is formed.

The lower insulating layer 5 is formed by a CVD method, for example. As the lower insulating layer 5, a silicon oxide (SiOx) layer, a silicon nitride (SiNx) layer, a silicon oxynitride (SiOxNy; x>y) layer, a silicon nitride oxide (SiNxOy; x>y) layer, or the like may be used as appropriate. The lower insulating layer 5 may be a single layer or may include a layered structure. For example, a silicon nitride (SiNx) layer, a silicon nitride oxide layer, or the like may be formed on a substrate side (lower layer) in order to prevent diffusion of impurities and the like from the substrate 1, and a silicon oxide (SiO$_2$) layer, a silicon oxynitride layer, or the like may be formed as a layer (upper layer) thereon in order to ensure insulating properties. Here, a silicon oxide (SiO$_2$) layer (having a thickness of 350 nm, for example) is formed as the lower insulating layer 5 by a CVD method, for example. Alternatively, a layered film having a silicon nitride (SiNx) layer (having a thickness of from 50 to 600 nm) as a lower layer and a silicon oxide (SiO$_2$) layer (having a thickness of from 50 to 600 nm) as an upper layer may be formed as the lower insulating layer 5.

Figure 10:
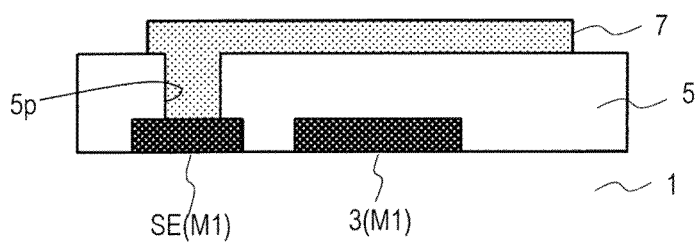
FIG. 10 is a process cross-sectional view illustrating the method for manufacturing the active matrix substrate 1001.

STEP 3: Forming Oxide Semiconductor Layer 7 (FIG. 10)

Subsequently, an oxide semiconductor film (having a thickness of, for example, 15 nm or more and 200 nm or less) is formed on the lower insulating layer 5. Then, annealing treatment of the oxide semiconductor film may be performed. Subsequently, patterning of the oxide semiconductor film is performed with a known photolithography process. In this manner, as illustrated in FIG. 10, the oxide semiconductor layer 7 serving as an active layer of the TFT 101 is obtained. The oxide semiconductor layer 7 is connected to the source electrode SE in the source opening 5p. The oxide semiconductor layer 7 may come into direct contact with the source electrode SE.

The oxide semiconductor film may be formed by a sputtering method, for example. Here, as the oxide semiconductor film, an In—Ga—Zn—O-based semiconductor film (having a thickness of 50 nm) film containing In, Ga, and Zn is formed. Patterning of the oxide semiconductor film may be, for example, performed by wet etching using a PAN-based etching solution containing phosphoric acid, nitric acid, and acetic acid.

Figure 11:
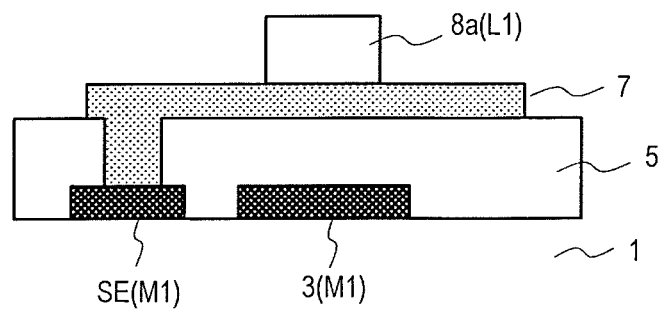
FIG. 11 is a process cross-sectional view illustrating the method for manufacturing the active matrix substrate 1001.

STEP 4: Forming First Insulating Layer 8a (FIGS. 11 and 18)

Next, the first insulating film L1 is formed so as to cover the lower insulating layer 5 and the oxide semiconductor layer 7. The material and the thickness of the first insulating film L1 are as described above. As the first insulating film L1, an SiO$_2$ film having a thickness of, for example, 100 nm is formed.

Subsequently, the first insulating film L1 is patterned. Here, a resist layer is formed on the first insulating film L1, and the first insulating film L1 is etched (for example, dry-etched) using the resist layer as a mask. As a result, as illustrated in FIGS. 11 and 18, the first insulating layer 8a covering the first region 71 of the oxide semiconductor layer 7 and the insulating layer 8b located in the intersection R are obtained. Note that although here, the first insulating layer 8a and the insulating layer 8b separated from each other are formed of the first insulating film L1, the shape after patterning is not limited thereto. An insulating layer having a predetermined planar shape may be appropriately formed of the first insulating film L1 (see FIGS. 4A to 4C).

Figure 12:
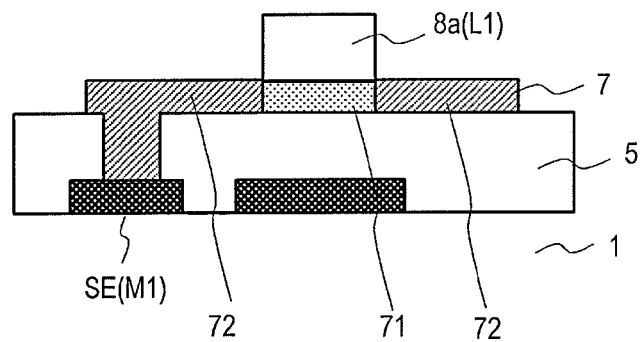
FIG. 12 is a process cross-sectional view illustrating the method for manufacturing the active matrix substrate 1001.

STEP 5: Forming Low-Resistive Region (FIG. 12)

Subsequently, resistance lowering of a region of the oxide semiconductor layer 7, which is exposed from the first insulating film L1, is performed. Resistance lowering processing (for example, plasma processing) may be performed on an exposed region of the oxide semiconductor layer 7. As a result, as illustrated in FIG. 12, when viewed from the normal direction of the main surface of the substrate 1, the region of the oxide semiconductor layer 7, which is exposed from the first insulating film L1 (here, the region not overlapping with the first insulating layer 8a), becomes the second region (low-resistive region) 72 having a specific resistance lower than the specific resistance of the first region 71 covered by the first insulating film L1. The low-resistive region may be a conductive region (for example, sheet resistance equal to or less than 200Ω/□).

The method and conditions of resistance lowering processing are described in JP 2008-40343 A, for example. The entire contents of the disclosure of JP 2008-40343 A are incorporated herein by reference.

In the present resistance lowering step, resistance lowering processing such as plasma processing need not be performed. For example, as described below, by forming the second insulating film L2, a resistance of a portion of the oxide semiconductor layer 7 that is in contact with the second insulating film L2 may be caused to be lower than a resistance of a portion of the oxide semiconductor layer 7 that is not in contact with the second insulating film L2.

STEP 6: Forming Second Insulating Layer 9 (FIG. 13)

Figure 13:
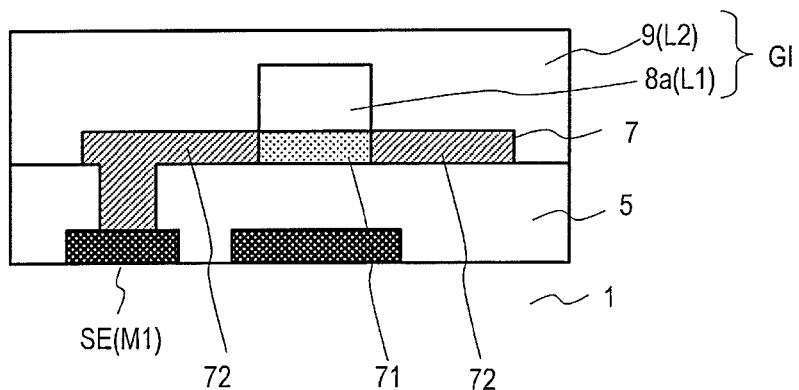
FIG. 13 is a process cross-sectional view illustrating the method for manufacturing the active matrix substrate 1001.

Next, as illustrated in FIG. 13, the second insulating film L2 is formed so as to cover the first insulating film L1 and the oxide semiconductor layer 7. The material and the thickness of the second insulating film L2 are as described above. As the second insulating film L2, a SiN film having a thickness of, for example, 100 nm is formed. As a result, the gate insulating layer GI including the first insulating layer 8a and the second insulating layer 9 is obtained.

As described above, when a hydrogen-donating film such as an SiN film is used as the second insulating film L2, the second insulating film L2 is formed so as to be in contact with the exposed portion of the oxide semiconductor layer 7, so that it is possible to lower the resistance of the exposed portion of the oxide semiconductor layer 7.

Figure 14:
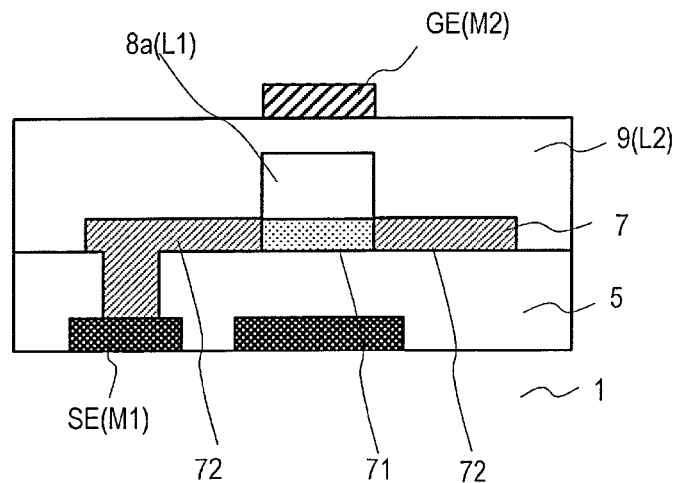
FIG. 14 is a process cross-sectional view illustrating the method for manufacturing the active matrix substrate 1001.

STEP 7: Forming Gate Electrode GE (FIGS. 14 and 19)

A second conductive film is formed on the second insulating layer 9 and patterning (for example, wet etching) of the second conductive film is performed by a known photolithography process. In this manner, as illustrated in FIGS. 14 and 19, the second metal layer M2 including the gate bus line GL and the gate electrode GE of each TFT is formed.

As the second conductive film, a metal such as molybdenum (Mo), tungsten (W), aluminum (Al), copper (Cu), titanium (Ti), tantalum (Ta), or the like, or an alloy thereof can be used, for example. The second conductive film may have a layered structure including a plurality of layers formed of different conductive materials. Here, a layered film having a Ti film as a lower layer and a Cu film as an upper layer is used.

STEP 8: Forming Upper Insulating Layer 13 (FIG. 15)

Figure 15:
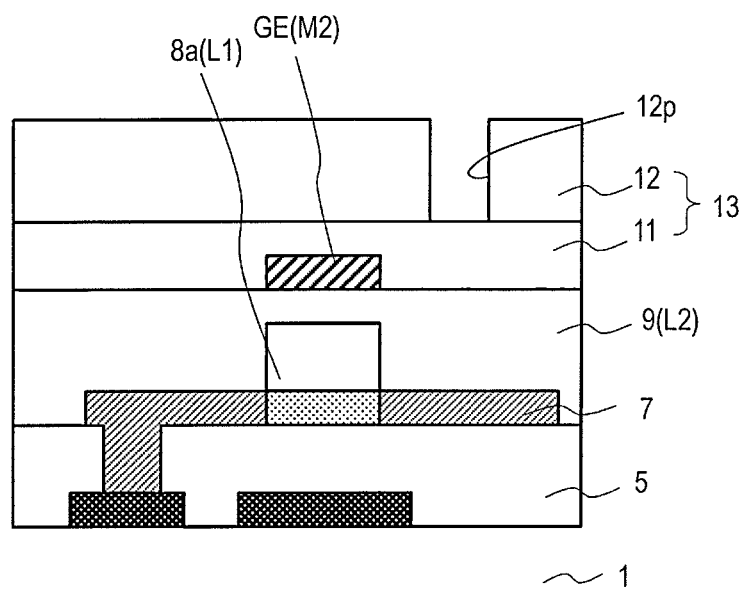
FIG. 15 is a process cross-sectional view illustrating the method for manufacturing the active matrix substrate 1001.

Next, as illustrated in FIG. 15, the upper insulating layer 13 is formed to cover the second metal layer M2. Here, as the upper insulating layer 13, an inorganic insulating layer 11 (having a thickness of 50 nm or more and 500 nm or less, for example) and an organic insulating layer 12 (having a thickness of 1 to 3 μm, preferably 2 to 3 μm, for example) are formed in this order. The entire portion of the organic insulating layer 12 located in the non-display region may be removed. Note that the organic insulating layer 12 need not be formed.

The inorganic insulating layer 11 can be formed with a single layer or a multi-layer of an inorganic insulating layer such as a silicon oxide film, a silicon nitride film, a silicon oxynitride film, or a silicon nitride oxide film. Here, as the inorganic insulating layer 11, for example, an SiNx layer (having a thickness of 300 nm) is formed by the CVD method. The organic insulating layer 12 may be, for example, an organic insulating film containing a photosensitive resin material (for example, an acrylic resin film). Next, the organic insulating layer 12 is patterned. In this manner, in each pixel area PIX, an opening 12p for exposing a part of the inorganic insulating layer 11 is formed in the organic insulating layer 12. The opening 12p is disposed so as to overlap with the second region 72 of the oxide semiconductor layer 7 when viewed from the normal direction of the substrate 1.

STEP 9: Forming First Transparent Conductive Layer T1 (FIG. 16)

Figure 16:
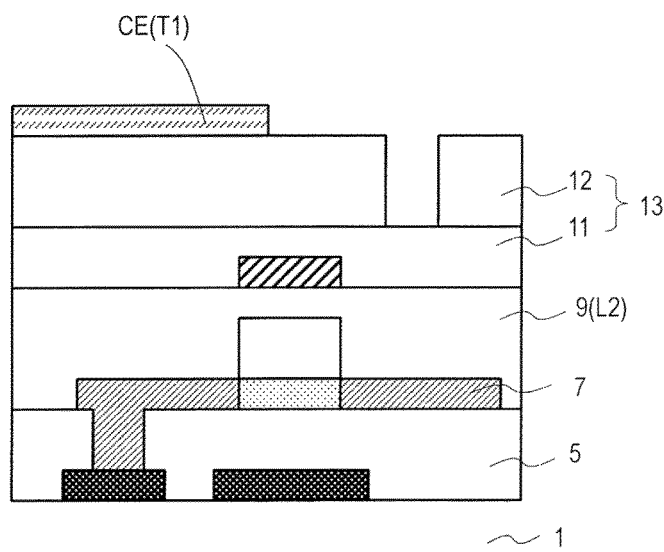
FIG. 16 is a process cross-sectional view illustrating the method for manufacturing the active matrix substrate 1001.

Subsequently, as illustrated in FIG. 16, the first transparent conductive layer T1 including the common electrode CE is formed on the upper insulating layer 13.

First, the first transparent conductive film (having a thickness of from 20 to 300 nm) (not illustrated) is formed on the upper insulating layer 13. Here, for example, an indium-zinc oxide film is formed as the first transparent conductive film by a sputtering method. As a material of the first transparent conductive film, metal oxide such as indium-tin oxide (ITO), indium-zinc oxide, and ZnO can be used. Subsequently, patterning of the first transparent conductive film is performed. In the patterning, wet etching may be performed using an oxalic acid-based etching solution, for example. This allows the common electrode CE to be obtained. The common electrode CE has, for example, an opening in a pixel contact portion-formed region in which the pixel contact hole CHp is formed. The common electrode CE may be disposed across substantially the entire display region except the pixel contact portion-formed region.

STEP 10: Forming Dielectric Layer 17 (FIG. 17)

Figure 17:
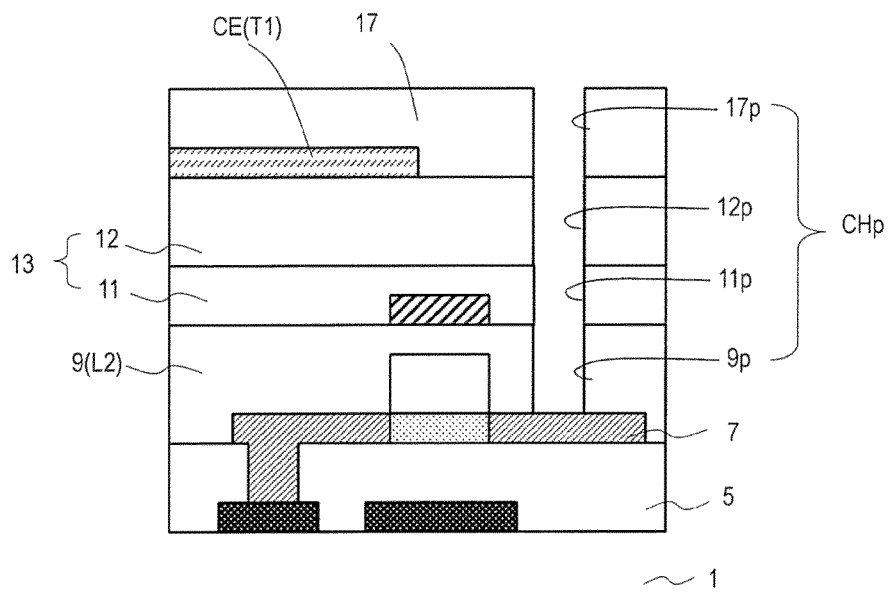
FIG. 17 is a process cross-sectional view illustrating the method for manufacturing the active matrix substrate 1001.

Subsequently, as illustrated in FIG. 17, the dielectric layer (having a thickness of from 50 to 500 nm) 17 is formed so as to cover the common electrode CE.

A material of the dielectric layer 17 may be the same as the material exemplified as the material of the inorganic insulating layer 11. Here, as the dielectric layer 17, for example, a SiN film is formed by the CVD method.

Subsequently, with a known photolithography process, etching of the dielectric layer 17, the inorganic insulating layer 11, and the second insulating layer 9 is performed to form openings 17p, 11p, 9p. In this manner, the pixel contact hole CHp for exposing a part of the second region 72 of the oxide semiconductor layer 7 is formed in the pixel area PIX. The pixel contact hole CHp is constituted by the opening 11p formed in the inorganic insulating layer 11, the opening 12p in the organic insulating layer 12, the opening 17p in the dielectric layer 17, and the opening 9p in the second insulating layer 9.

Note that, here, patterning of the inorganic insulating layer 11 is simultaneously performed with the dielectric layer 17. Instead, after the organic insulating layer 12 is formed and before the dielectric layer 17 is formed, patterning of the inorganic insulating layer 11 and the second insulating layer 9 may be performed using the organic insulating layer 12 as a mask.

STEP 11: Forming Second Transparent Conductive Layer T2 (FIGS. 2A and 2B)

Subsequently, the second transparent conductive layer T2 including the pixel electrode PE is formed on the dielectric layer 17. Specifically, first, a second transparent conductive film (having a thickness of from 20 to 300 nm) (not illustrated) is formed on the dielectric layer 17 and in the pixel contact hole CHp. A material of the second transparent conductive film may be the same as the material exemplified as the material of the first transparent conductive film. Subsequently, patterning of the second transparent conductive film is performed. Here, for example, wet etching of the second transparent conductive film is performed by using an oxalic acid etching solution. In this manner, the pixel electrode PE having a slit (or a notched portion) is formed in each pixel area PIX (see FIGS. 2A and 2B). The pixel electrode PE is formed on the dielectric layer 17 and in the pixel contact hole CHp, and is in contact with the second region 72 of the oxide semiconductor layer 7 in the pixel contact hole CHp. In this manner, the active matrix substrate 1001 is manufactured.

Method for Manufacturing Active Matrix Substrate 1002

Figure 21:
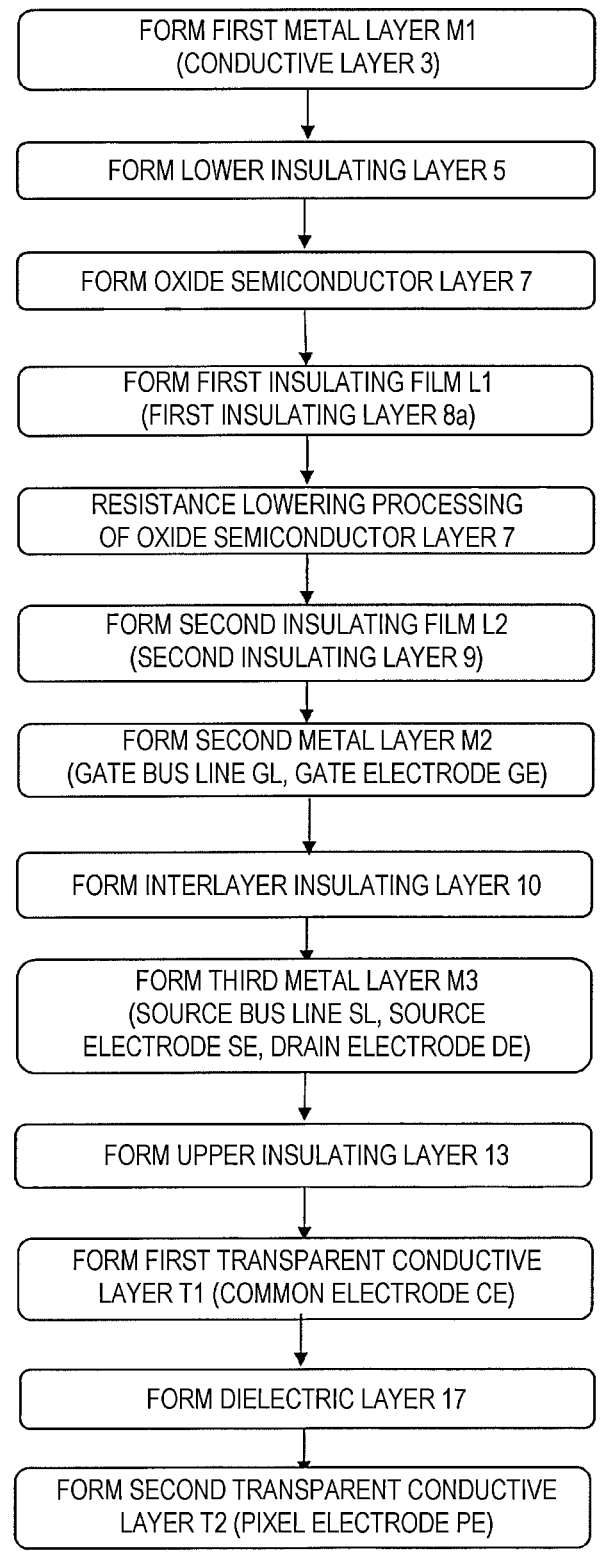
FIG. 21 is a flowchart illustrating an example of a method for manufacturing the active matrix substrate 1002.

FIG. 21 is a diagram illustrating a process flow of a method for manufacturing the active matrix substrate 1002.

Hereinafter, the method for manufacturing the active matrix substrate 1002 will be described. Here, points different from the method for manufacturing the active matrix substrate 1001 will be mainly described, and the description of the same steps will be omitted.

First, similarly to the active matrix substrate 1001, the first metal layer M1, the lower insulating layer 5, the oxide semiconductor layer 7, the first insulating layer 8a, the second insulating layer 9, and the second metal layer M2 are formed. However, neither source electrode SE nor source bus line SL is formed in the first metal layer M1. Thus, it is not necessary to form an opening for connecting the source electrode and the oxide semiconductor layer in the lower insulating layer 5.

After the second metal layer M2 is formed, the interlayer insulating layer 10 covering the second metal layer M2 is formed. The interlayer insulating layer 10 can be formed with a single layer or a multi-layer of an inorganic insulating layer such as a silicon oxide film, a silicon nitride film, a silicon oxynitride film, or a silicon nitride oxide film. The thickness of the inorganic insulating layer may be 100 nm or more and 1000 nm or less. Here, as the interlayer insulating layer 10, for example, an $SiO_2$ layer (having a thickness of, for example, 300 nm) is formed by a CVD method. After this, the first opening 10s that exposes a part of the second region 72 (source contact region 72s) of the oxide semiconductor layer 7, and the second opening 10d that exposes another part of the second region 72 (drain contact region 72d) are formed in the interlayer insulating layer 10 by, for example, dry etching.

Subsequently, the third metal layer M3 is formed on the interlayer insulating layer 10. Specifically, first, a third conductive film (having a thickness of 50 nm or more and 500 nm or less, for example) is formed on the interlayer insulating layer 10, and the third conductive film is patterned. This forms the third metal layer M3 including the source electrode SE, the drain electrode DE, and the source bus line SL. The source electrode SE and the drain electrode DE are connected to the oxide semiconductor layer 7 in the first opening 10s and the second opening 10d, respectively.

As the third conductive film, for example, an element selected from aluminum (Al), chromium (Cr), copper (Cu), tantalum (Ta), titanium (Ti), molybdenum (Mo), and tungsten (W), an alloy containing these elements as components, or the like can be used. For example, the third conductive film may have a triple-layer structure of titanium film-aluminum film-titanium film, or a triple-layer structure of molybdenum film-aluminum film-molybdenum film can be used. Note that the second conductive film is not limited to the triple-layer structure, and may have a single layer or a dual-layer structure, or a layered structure of four or more layers. Here, a layered film having a Ti film (having a thickness of from 15 to 70 nm) as a lower layer and having a Cu film (having a thickness of from 50 to 400 nm) as an upper layer is used. When a layered film using an ohmic conductive film such as the Ti film as the lowest layer is used, the contact resistance with the oxide semiconductor layer 7 can be reduced more effectively.

Thereafter, similarly to the active matrix substrate 1001, the upper insulating layer 13, the first transparent conductive layer T1, the dielectric layer 17, and the second transparent conductive layer T2 are formed, thereby manufacturing the active matrix substrate 1002.

Oxide Semiconductor

The oxide semiconductor (also referred to as metal oxide, or an oxide material) included in the oxide semiconductor layer of each TFT according to the present embodiment may be an amorphous oxide semiconductor or a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to the layer surface.

The oxide semiconductor layer may have a layered structure including two or more layers. When the oxide semiconductor layer has the layered structure, the oxide semiconductor layer may include an amorphous oxide semiconductor layer and a crystalline oxide semiconductor layer. Alternatively, the oxide semiconductor layer may include a plurality of crystalline oxide semiconductor layers having different crystal structures. The oxide semiconductor layer may include a plurality of amorphous oxide semiconductor layers. In a case where the oxide semiconductor layer has a dual-layer structure including an upper layer and a lower layer, an energy gap of the oxide semiconductor included in a layer positioned on the gate electrode side of the dual-structure (that is the lower layer in the case of the bottom gate structure, and the upper layer in the case of the top gate structure) may be smaller than an energy gap of the oxide semiconductor included in a layer positioned opposite to the gate electrode (that is the upper layer in the case of the bottom gate structure, and the lower layer in the case of the top gate structure). However, in a case where a difference in the energy gap between these layers is relatively small, the energy gap of the oxide semiconductor included in the layer positioned on the gate electrode side may be greater than the energy gap of the oxide semiconductor included in the layer positioned opposite to the gate electrode.

Materials, structures, and film formation methods of an amorphous oxide semiconductor and the above-described crystalline oxide semiconductors, a configuration of an oxide semiconductor layer having a layered structure, and the like are described in, for example, JP 2014-0073911 A. The entire contents of the disclosure of JP 2014-0073911 A are incorporated herein by reference.

The oxide semiconductor layer may include, for example, at least one metal element selected from In, Ga, and Zn. In the present embodiment, the oxide semiconductor layer includes, for example, an In—Ga—Zn—O-based semiconductor (for example, an indium gallium zinc oxide). Here, the In—Ga—Zn—O-based semiconductor is a ternary oxide of indium (In), gallium (Ga), and zinc (Zn), and a ratio (composition ratio) of In, Ga, and Zn is not particularly limited. For example, the ratio includes In:Ga:Zn=2:2:1, In:Ga:Zn=1:1:1, or In:Ga:Zn=1:1:2. Such an oxide semiconductor layer can be formed of an oxide semiconductor film including an In—Ga—Zn—O-based semiconductor.

The In—Ga—Zn—O-based semiconductor may be an amorphous semiconductor or may be a crystalline semiconductor. A crystalline In—Ga—Zn—O-based semiconductor in which a c-axis is oriented substantially perpendicular to a layer surface is preferable as the crystalline In—Ga—Zn—O-based semiconductor.

Note that a crystal structure of the crystalline In—Ga—Zn—O-based semiconductor is disclosed, for example, in JP 2014-0073911 A described above, JP 2012-134475 A, JP 2014-2090627 A, and the like. The entire contents of the disclosures of JP 2012-134475 A and JP 2014-2090627 A are incorporated herein by reference. A TFT including an In—Ga—Zn—O-based semiconductor layer has a high mobility (more than 20 times as compared to an a-Si TFT) and a low leakage current (less than 1/100 as compared to the a-Si TFT). Thus, such a TFT can be suitably used as a driving TFT (for example, a TFT included in a drive circuit provided in a periphery of a display region including a plurality of pixels, and on the same substrate as the display region) and a pixel TFT (TFT provided in a pixel).

In place of the In—Ga—Zn—O-based semiconductor, the oxide semiconductor layer may include another oxide semiconductor. For example, the oxide semiconductor layer may include an In—Sn—Zn—O-based semiconductor (for example, $In_2O_3$—$SnO_2$—ZnO; InSnZnO). The In—Sn—Zn—O-based semiconductor is a ternary oxide of indium (In), tin (Sn), and zinc (Zn). Alternatively, the oxide semiconductor layer may include an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, cadmium oxide (CdO), a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, an In—Ga—Zn—Sn—O-based semiconductor, an In—W—Zn—O-based semiconductor, and the like.

INDUSTRIAL APPLICABILITY

Embodiments of the present disclosure may be suitably applied to an active matrix substrate including the monolithically formed peripheral circuits. Such an active matrix substrate can be applied to various electronic devices such as a display device such as a liquid crystal display device, an organic electroluminescence (EL) display device, and an inorganic electroluminescence display device and the like, an imaging device such as an image sensor, an image input device, a fingerprint reader, and a semiconductor memory and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An active matrix substrate comprising:
   a substrate; and
   a plurality of oxide semiconductor TFTs supported on the substrate,
   wherein each of the plurality of oxide semiconductor TFTs includes
      an oxide semiconductor layer including a first region and a second region having a resistance value lower than a resistance value of the first region, and
      a gate electrode disposed on at least a part of the first region of the oxide semiconductor layer with a gate insulating layer interposed between the gate electrode and the part of the first region of the oxide semiconductor layer, the gate insulating layer includes a first insulating layer and a second insulating layer disposed on the first insulating layer, and the first insulating layer overlaps with the first region and does not overlap with the second region, and the second insulating layer overlaps with the first region and at least a part of an upper surface of the second region, when viewed from a normal direction of the substrate.

2. The active matrix substrate according to claim 1, wherein the second insulating layer covers a side surface and an upper surface of the first insulating layer.

3. The active matrix substrate according to claim 1, wherein the first insulating layer includes an insulating material different from an insulating material of the second insulating layer.

4. The active matrix substrate according to claim 1, wherein the second insulating layer is in direct contact with the at least a part of the upper surface of the second region.

5. The active matrix substrate according to claim 1, wherein the first region of the oxide semiconductor layer includes a channel region overlapping with the gate electrode, and an offset region not overlapping with the gate electrode but overlapping with the first insulating layer, when viewed from the normal direction of the substrate.

6. The active matrix substrate according to claim 1, wherein the second insulating layer is a layer capable of reducing an oxide semiconductor included in the oxide semiconductor layer.

7. The active matrix substrate according to claim 1, wherein the second insulating layer is a hydrogen-donating layer capable of supplying hydrogen, and the first insulating layer is an oxygen-donating layer capable of supplying oxygen.

8. The active matrix substrate according to claim 7, wherein the first insulating layer is a silicon oxide layer, and the second insulating layer is a silicon nitride layer.

9. The active matrix substrate according to claim 1, wherein the first insulating layer includes a tapered portion on a side surface of the first insulating layer, the first region of the oxide semiconductor layer includes a main portion overlapping with the upper surface of the first insulating layer, and a side portion overlapping with the tapered portion, when viewed from the normal direction of the substrate, and a resistance value of the side portion is lower than a resistance value of the main portion and higher than the resistance value of the second region.

10. The active matrix substrate according to claim 1, further comprising:

an interlayer insulating layer covering the gate electrode of each of the plurality of oxide semiconductor TFTs, wherein the source electrode of each of the plurality of oxide semiconductor TFTs is disposed on the interlayer insulating layer, and is electrically connected to the part of the second region of the oxide semiconductor layer in an opening formed in the interlayer insulating layer and the second insulating layer.

11. The active matrix substrate according to claim 1, further comprising:

a display region including a plurality of pixel areas;
a non-display region provided around the display region; and a peripheral circuit disposed in the non-display region,
wherein each of the plurality of oxide semiconductor TFTs includes one or more TFT constituting the peripheral circuit.

12. An active matrix substrate comprising:
a substrate; and
a plurality of oxide semiconductor TFTs supported on the substrate,
wherein each of the plurality of oxide semiconductor TFTs includes
an oxide semiconductor layer including a first region and a second region having a resistance value lower than a resistance value of the first region, and
a gate electrode disposed on at least a part of the first region of the oxide semiconductor layer with a gate insulating layer interposed between the gate electrode and the part of the first region of the oxide semiconductor layer, the gate insulating layer includes a first insulating layer and a second insulating layer disposed on the first insulating layer, and the first insulating layer overlaps with the first region and does not overlap with the second region, and the second insulating layer overlaps with the first region and at least a part of the second region, when viewed from a normal direction of the substrate the active matrix substrate further includes
a plurality of gate bus lines supported by the substrate and extending in a first direction; and
a plurality of source bus lines supported by the substrate and extending in a second direction intersecting with the first direction, the active matrix substrate includes a plurality of pixel areas and each of the plurality of oxide semiconductor TFTs is disposed in association with one of the plurality of pixel areas, each of the plurality of oxide semiconductor TFTs further includes a source electrode electrically connected to a part of the second region of the oxide semiconductor layer the gate electrode of each of the plurality of oxide semiconductor TFTs is electrically connected to one of the plurality of gate bus lines, and the source electrode is electrically connected to one of the plurality of source bus lines, the active matrix substrate includes an intersection where one of the plurality of source bus lines intersects with one of the plurality of gate bus lines, in the intersection, a third insulating layer and the second insulating layer extending on the third insulating layer are located between the one of the plurality of source bus lines and the one of the plurality of gate bus lines, the third insulating layer is made of a same material of the first insulating layer and the first insulating layer and the third insulating layer are connected.

13. An active matrix substrate comprising:
a substrate; and
a plurality of oxide semiconductor TFTs supported on the substrate,
wherein each of the plurality of oxide semiconductor TFTs includes
an oxide semiconductor layer including a first region and a second region having a resistance value lower than a resistance value of the first region, and
a gate electrode disposed on at least a part of the first region of the oxide semiconductor layer with a gate insulating layer interposed between the gate electrode and the part of the first region of the oxide semiconductor layer, the gate insulating layer includes a first insulating layer and a second insulating layer disposed on the first insulating layer, and the first insulating layer overlaps with the first region and does not overlap with the second region, and the second insulating layer overlaps with the first region and at least a part of the second region, when viewed from a normal direction of the substrate, the active matrix substrate further includes
a plurality of gate bus lines supported by the substrate and extending in a first direction; and
a plurality of source bus lines supported by the substrate and extending in a second direction intersecting with the first direction, the active matrix substrate includes a plurality of pixel areas and each of the plurality of oxide semiconductor TFTs is disposed in association with one of the plurality of pixel areas each of the plurality of oxide semiconductor TFTs further includes a source electrode electrically connected to a part of the second region of the oxide semiconductor layer, the gate electrode of each of the plurality of oxide semiconductor TFTs is electrically connected to one of the plurality of gate bus lines, and the source electrode is electrically connected to one of the plurality of source bus lines, the active matrix substrate includes an intersection where one of the plurality of source bus lines intersects with one of the plurality of gate bus lines, in the intersection, a third insulating layer and the second insulating layer extending on the third insulating layer are located between the one of the plurality of source bus lines and the one of the plurality of gate bus lines the third insulating layer is made of a same material of the first insulating layer, and the first insulating layer extends between the one of the plurality of gate bus lines and the substrate across two or more pixel areas aligned in the first direction of the plurality of pixel areas.

14. The active matrix substrate according to claim 13, wherein an edge of a portion of the one of the plurality of gate bus lines, the portion being located above the first insulating layer, is located inside the first insulating layer, when viewed from the normal direction of the substrate.

* * * * *